(12) United States Patent
Niimi et al.

(10) Patent No.: US 6,310,441 B1
(45) Date of Patent: Oct. 30, 2001

(54) DISPLAY AND METHOD FOR PRODUCING THE SAME

(75) Inventors: Norikazu Niimi, Kasugai; Michio Asai, Nagoya, both of (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 09/325,919

(22) Filed: Jun. 4, 1999

(30) Foreign Application Priority Data

Jun. 8, 1998 (JP) .................................................. 10-159731

(51) Int. Cl.$^7$ ...................................................... G09G 3/10
(52) U.S. Cl. .......................................... 315/169.4; 313/400
(58) Field of Search ................................ 315/169.4, 167, 315/187; 313/400, 30, 491, 492

(56) References Cited

U.S. PATENT DOCUMENTS

| | | |
|---|---|---|
| 2,997,922 | 8/1961 | Kaprelian . |
| 3,376,092 | 4/1968 | Kushner et al. . |
| 3,698,793 | 10/1972 | Tellerman ........................ 350/160 R |
| 3,739,218 | * 6/1973 | Maloney ............................... 313/188 |
| 3,801,852 | 4/1974 | Janning ................................ 313/220 |
| 5,319,491 | 6/1994 | Selbrede .............................. 359/291 |
| 5,438,343 | 8/1995 | Khan et al. .......................... 315/493 |
| 5,771,321 | 6/1998 | Stern ..................................... 385/31 |
| 5,953,469 | 9/1999 | Zhou .................................... 385/22 |
| 5,986,409 | * 11/1999 | Farnworth et al. ............... 315/169.4 |

* cited by examiner

*Primary Examiner*—Don Wong
*Assistant Examiner*—Trinh Vo Dinh
(74) *Attorney, Agent, or Firm*—Burr & Brown

(57) ABSTRACT

A light emission display having a housing including at least two glass members thermally glued to one another at a predetermined atmospheric pressure to form a plurality of cavities inside the housing, and at least one of a gas and a light emitting substance contained within the cavities. Electrodes are located between the glass members and protrude into each cavity in only a coplanar manner with respect to a main surface of one of the glass members. An input signal is supplied to the electrodes resulting in selective light emission from the cavities.

22 Claims, 25 Drawing Sheets

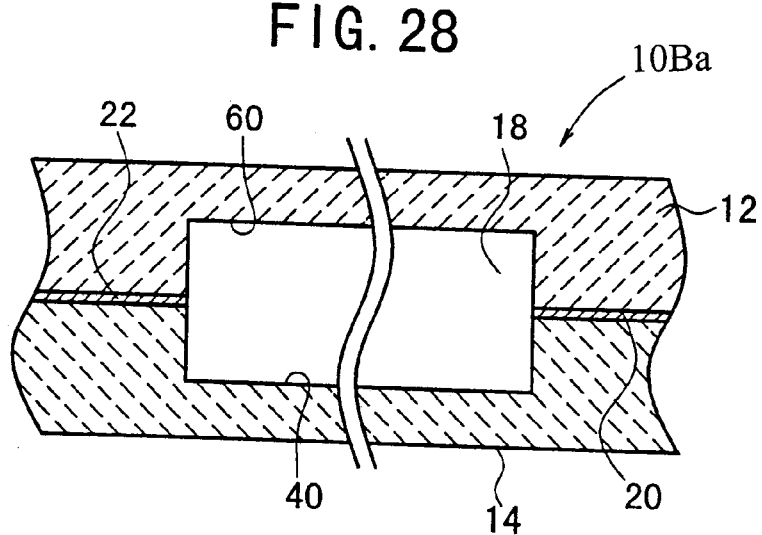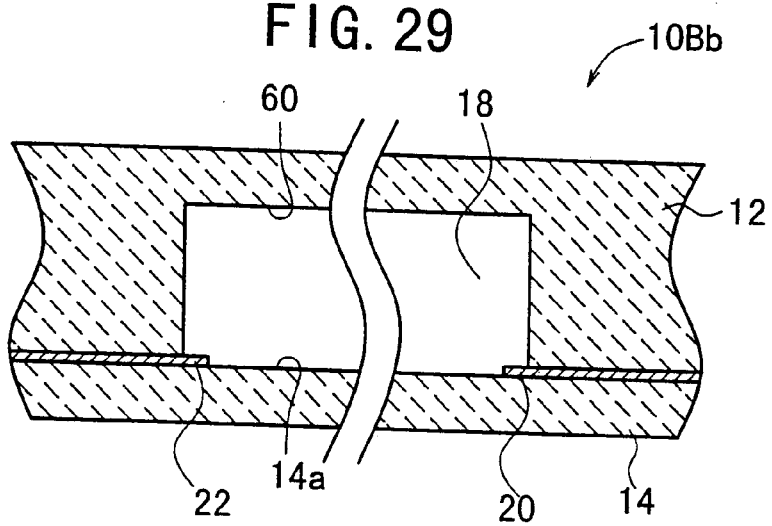

DISPLAY AND METHOD FOR PRODUCING THE SAME

BACKGROUND OF THE INVENTION

1. Field of the Invention

The present invention relates to a display and a method for producing the same, based on the principle of the electronic tube which utilizes the discharge light emission of at least one of a gas and a light emitting substance enclosed in a formed product made of, for example, a glass material.

2. Description of the Related Art

In general, the light source, which utilizes the discharge light emission of at least one of the gas and the light emitting substance enclosed in a tube made of glass, includes electronic tubes such as mercury lamps, fluorescent tubes, sodium lamps, carbon arc lamps, zirconium discharge lamps, neon tubes, and flash discharge lamps.

The electronic tube as described above is manufactured, for example, such that an anode bar is fused to one end of a cylindrical glass tube, and then a cathode bar is fused to the other end of the glass tube in a predetermined gas atmosphere (atmosphere containing the gas to be enclosed) to enclosed the predetermined gas in the glass tube.

It is contemplated that such an electronic tube is utilized to display, for example, images and characters at the outdoor.

In such a situation, it is conceived that a large number of electronic tubes are arranged so that the light is selectively emitted from the electronic tubes. However, the respective electronic tubes exist as single members. Therefore, when the large number of electronic tubes are arranged, the scale is inevitably large. As a result, problems arise in that the installation space is enlarged, the wiring operation is complicated, and the production cost becomes expensive.

Under the circumstances, it is expected that the electronic tube itself is allowed to have a miniature size. However, if the electronic tube is miniaturized, then the distance between the anode and the cathode is decreased, and the pressure at the inside of the glass tube is further increased during the light emission. Therefore, it is necessary to increase the strength of the glass tube in association with the miniaturization of the electronic tube.

SUMMARY OF THE INVENTION

The present invention has been made taking the foregoing problems into consideration, an object of which is to provide a display which makes it possible to simultaneously realize the integration and the miniaturization of the electronic tube and present the display expression for information transmission at a high brightness.

Another object of the present invention is to provide a method for producing a display, in which it is possible to easily produce the display which makes it possible to simultaneously realize the integration and the miniaturization of the electronic tube and present the display expression for information transmission at a high brightness.

According to the present invention, there is provided a display comprising a housing formed by confronting at least two glass members with each other in a predetermined atmosphere and thermally gluing them under a pressure; at least one or more cavities formed in the housing and enclosed with at least one of a gas and a light emitting substance at its inside; and mutually confronting electrodes provided for the cavity interposed therebetween; wherein at least two or more of the cavities are arranged by the aid of at least one of the housing; and an output corresponding to an inputted signal is displayed in accordance with selective light emission effected in the cavities.

The cavity, in which at least one of the gas and the light emitting substance is enclosed, is formed in the housing which is manufactured by thermally gluing the glass members under the pressure. The electric power is applied to the electrodes which are opposed to one another with the cavity interposed therebetween. Thus, the discharge light emission is effected by at least one of the gas and the light emitting substance enclosed in the cavity. That is, one cavity functions as one electronic tube.

In the present invention, at least one housing is used to arrange at least two or more of the cavities. Therefore, when the cavities are arranged in conformity with the number of picture elements (image pixels) to be displayed, the discharge light emission is selectively effected by at least one of the gas and the light emitting substance enclosed in the cavities corresponding to the number of the picture elements, by selectively applying the electric power to the large number of electrodes confronting with each other with the cavities interposed therebetween, in accordance with the inputted image signal. Thus, the image, which corresponds to the image signal, is displayed on the display surface of the housing.

In this arrangement, the cavities are formed by thermally gluing the glass members under the pressure. Therefore, it is possible to integrate the large number of cavities at a high degree of integration, in accordance with which the miniaturization of the display can be easily realized.

As described above, according to the display concerning the present invention, it is possible to simultaneously realize the integration and the miniaturization of the electronic tube and present the display expression for information transmission at a high brightness.

In the arrangement described above, it is preferable that at least the glass member of the glass members for constructing the housing, which is disposed on a display side, is light-transmissive. Accordingly, the display surface of the housing is allowed to have the light-transmissive property. Therefore, it is possible to make the display expression at a high brightness for the output corresponding to the input signal. Thus, the display is most suitable, for example, as an electronic bulletin board installed at the outdoor.

In the arrangement described above, it is also preferable that the glass member of the glass members for constructing the housing, which does not contribute to display expression, is not light-transmissive. In this arrangement, the light components directed to the display surface of the housing, which are included in the light components radiated by the discharge light emission effected in the cavities, are radiated to the outside through the glass member having the light-transmissive property. However, the light components, which are directed to the surfaces other than the display surface of the housing, are absorbed by the glass member having no light-transmissive property.

Accordingly, it is possible to effectively avoid the crosstalk of light emission, which would be otherwise caused between the cavities. Thus, it is possible to effectively avoid the phenomenon which would otherwise result in the deterioration of image quality such as the image disturbance and the afterimage phenomenon.

In the arrangement described above, it is also preferable that a light-reflective film is formed on a surface portion except for a surface portion disposed on a display side, of an inner wall surface of the cavity. In this arrangement, the light components directed to the display surface of the housing, which are included in the light components radiated by the discharge light emission effected in the cavities, are radiated to the outside through the glass member having the light-transmissive property. However, the light components, which are directed to the surfaces other than the display surface of the housing, are reflected by the light-reflective surface. As a result, almost all of the light components generated in the cavity are directed to the display surface of the housing. Thus, it is possible to achieve a higher degree of brightness. Also in this arrangement, it is possible to effectively avoid the crosstalk of light emission, which would be otherwise caused between the cavities. Thus, it is possible to effectively avoid the phenomenon which would otherwise result in the deterioration of image quality such as the image disturbance and the afterimage phenomenon.

Further, a light-shielding substance may be allowed to intervene between the cavities. Accordingly, it is also possible to effectively avoid the crosstalk of light emission, which would be otherwise caused between the cavities.

In the arrangement described above, it is also preferable that the electrodes are constructed by lead wires fixed on a surface at which the glass members contact with each other. Alternatively, the electrodes may be constructed by thin films formed by printing on a surface at which the glass members contact with each other. Especially, when the electrodes are constructed by the thin films, then the labor for wiring arrangement can be eliminated, and it is possible to simplify the production steps. Further, the positioning can be easily performed in order to confront the electrodes with each other with the cavity interposed therebetween.

In the arrangement described above, it is also preferable that the glass member to be used has a bending strength of not less than 1000 kgf/cm$^2$.

For example, in the case of the display in which argon, mercury or the like is enclosed in the cavity, the glass member having a bending strength of about 1000 kgf/cm$^2$ is used. In the case of the display in which the gas such as xenon capable of obtaining a high brightness is enclosed, the glass member having a bending strength of about 3000 kgf/cm$^2$ is preferably used.

In general, in order to improve the resolution of the display expression, it is necessary to increase the number of cavities which function as electronic tubes. However, considering the miniaturization in such a situation, it is conceived that the respective cavities are reduced in size. If the size of the respective cavities is reduced, the pressure in the cavity is increased during the light emission in accordance therewith. However, when the glass member satisfies the condition for the bending strength as described above, a formed product is obtained, which is sufficiently capable of withstanding the pressure in the cavity. Thus, it is possible to avoid the inconvenience such as the light emission defect.

In the arrangement described above, it is also preferable that the glass member to be used has a coefficient of thermal expansion which is substantially zero or which is near to a coefficient of thermal expansion of the electrode. In this arrangement, the heat resistance is excellent, and the display is advantageous in resistance to the heat cycle relevant to the repetition of discharge light emission of at least one of the gas and the light emitting substance enclosed in the cavity.

According to another aspect of the present invention, there is provided a method for producing a display, comprising a first step of forming, by press forming on at least one of glass members, recesses for constructing cavities for enclosing at least one of a gas and a light emitting substance; a second step of providing electrodes on a contact surface of the glass member; and a third step of confronting respective contact surfaces of at least two of the glass members with each other so that they are thermally glued under a pressure in a predetermined atmosphere to manufacture a housing including at least one cavity at its inside, and thus the display is produced wherein at least two or more of the cavities are arranged by the aid of at least one of the housing, and an image corresponding to an inputted image signal is displayed in accordance with selective light emission effected in the cavities.

According to the method for producing the display concerning the present invention, it is possible to simultaneously realize the integration and the miniaturization of the electronic tube, and it is possible to present the display expression for information transmission at a high brightness.

In the present invention, it is preferable that a glass member having a light-transmissive property is used as at least the glass member of the glass members for constructing the housing, which is disposed on a display side. Accordingly, the display surface of the housing is allowed to have the light-transmissive property. Therefore, it is possible to make the display expression at a high brightness for the output corresponding to the input signal. Thus, the display is most suitable, for example, as an electronic bulletin board installed at the outdoor.

In the production method described above, it is preferable that a glass member having no light-transmissive property is used as the glass member of the glass members for constructing the housing, which does not contribute to display expression. It is also preferable that before the third step, a light-reflective film is formed on a surface portion except for a surface portion disposed on a display side, of an inner wall surface of the cavity. In this arrangement, it is possible to effectively avoid the crosstalk of light emission, which would be otherwise caused between the cavities. Thus, it is possible to effectively avoid the phenomenon which would otherwise result in the deterioration of image quality such as the image disturbance and the afterimage phenomenon. It is also preferable that a light-shielding substance is allowed to intervene between the cavities.

In the second step, it is preferable that the electrodes are provided by fixing lead wires on the contact surface of the glass member. It is also preferable that the electrodes are provided by forming a thin film by means of printing on the contact surface of the glass member.

It is also preferable that a glass member having a bending strength of not less than 1000 kgf/cm$^2$ is used as the glass member. It is also preferable that a glass member having a coefficient of thermal expansion which is substantially zero or which is near to a coefficient of thermal expansion of the electrode is used as the glass member.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 28 shows a longitudinal sectional view illustrating, with partial omission, a first modified embodiment of the display according to the second embodiment;

FIG. 29 shows a longitudinal sectional view illustrating, with partial omission, a second modified embodiment of the display according to the second embodiment;

DESCRIPTION OF THE PREFERRED EMBODIMENTS

Explanation will be made below with reference to FIGS. 1 to 38 for illustrative embodiments of the display and the method for producing the same according to the present invention.

Figure 1:
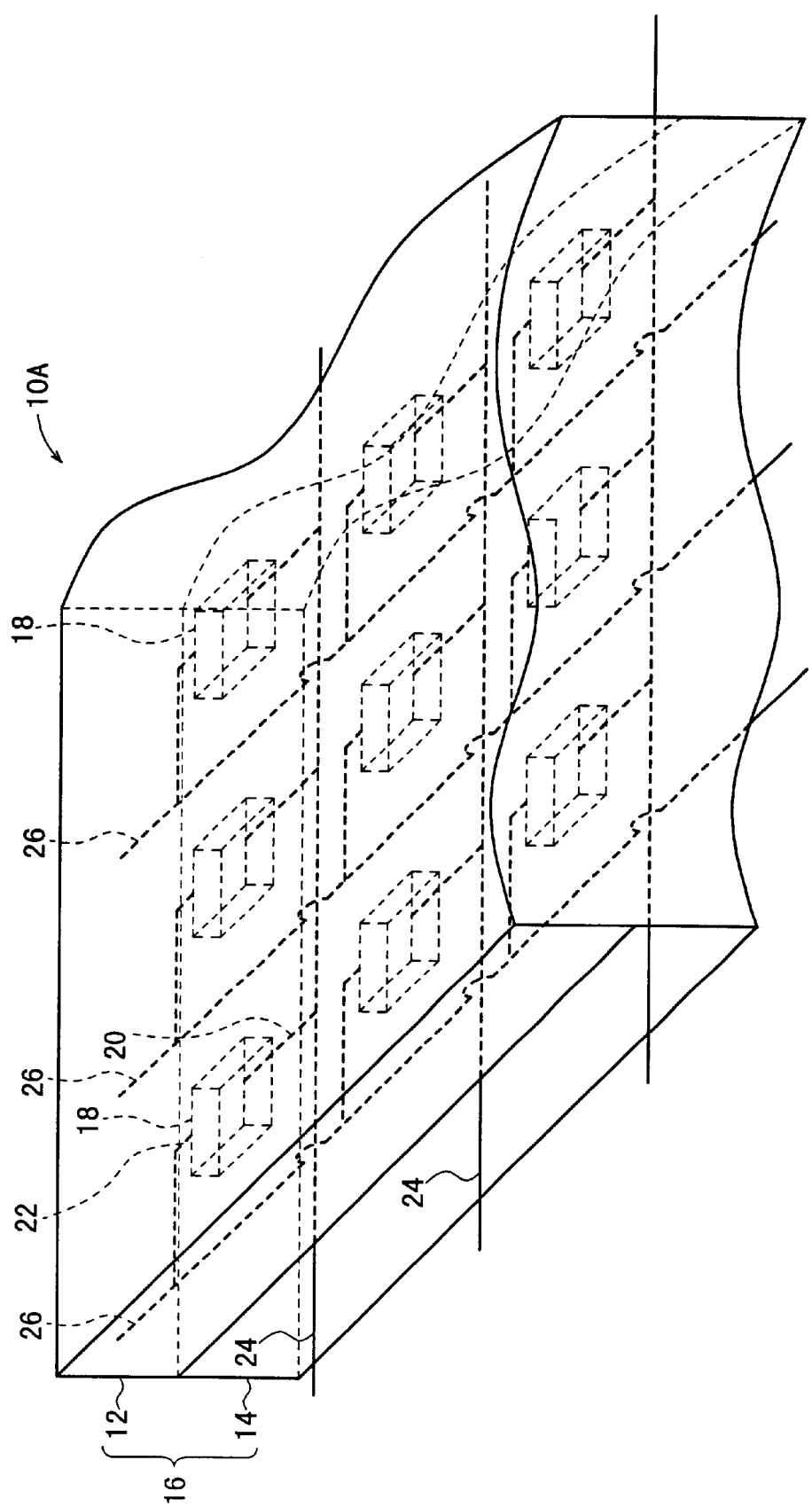
FIG. 1 shows a perspective view illustrating an arrangement of a display according to a first embodiment.

At first, as shown in FIG. 1, a display 10A according to the first embodiment comprises a housing 16 which is formed such that respective first principal surfaces of a rectangular upper housing member 12 and a rectangular lower housing member 14 made of a glass material are allowed to make contact with each other to thermally glue them by press under a pressure in a predetermined atmosphere, cavities 18 which are formed to have a number corresponding to picture elements (image pixels) in the housing 16 and which include at least one of a gas and a light emitting substance enclosed therein, and electrode wires 20, 22 (anodes and cathodes) which are provided for the respective picture elements and which have their ends confronting with each other with the cavities 18 being interposed therebetween.

The electrode wires 20, which constitute the respective anodes, are connected to vertical selection lines 24 arranged in the horizontal direction. The electrode wires 22, which constitute the respective cathodes, are connected to signal lines 26 arranged in the vertical direction. In the first embodiment, the vertical selection lines 24, the signal lines 26, and the electrode wires 20, 22 are composed of lead wires respectively.

Figure 2:
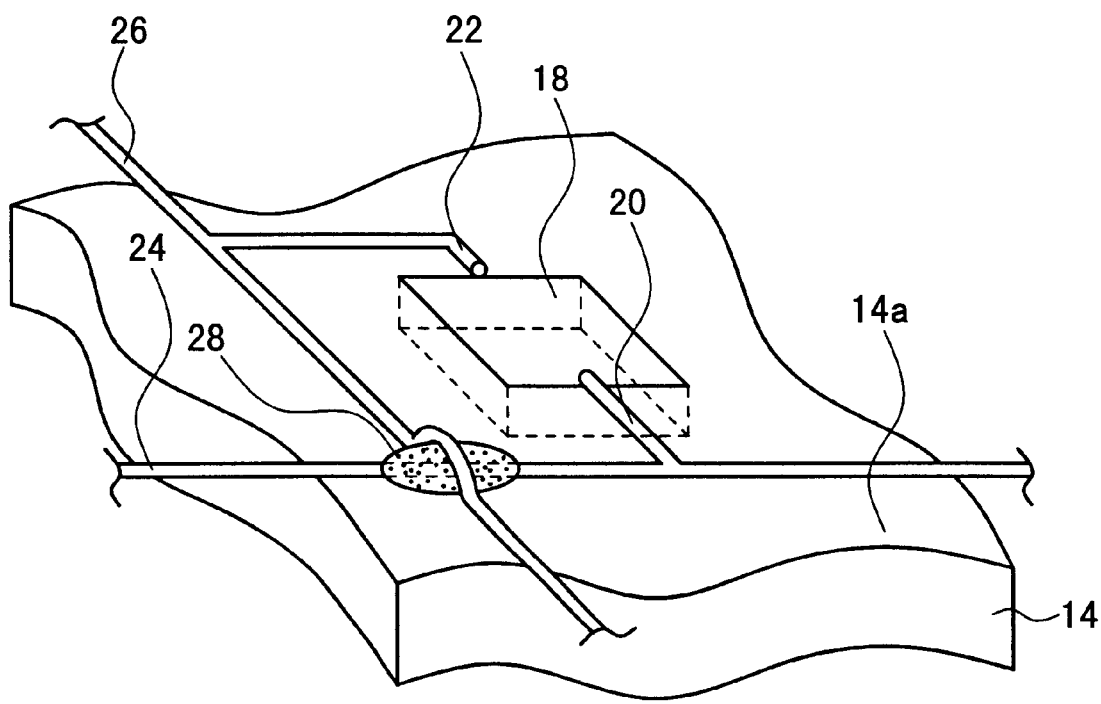
FIG. 2 shows a perspective view illustrating, with partial omission, a wiring arrangement state of the display according to the first embodiment.

As shown in FIG. 2, when the vertical selection line 24 and the signal line 26 are arranged and wired, a paste 28 made of a glass material is formed at a portion of intersection between the vertical selection line 24 and the signal line 26 to insulate the vertical selection line 24 from the signal line 26.

Figure 3:
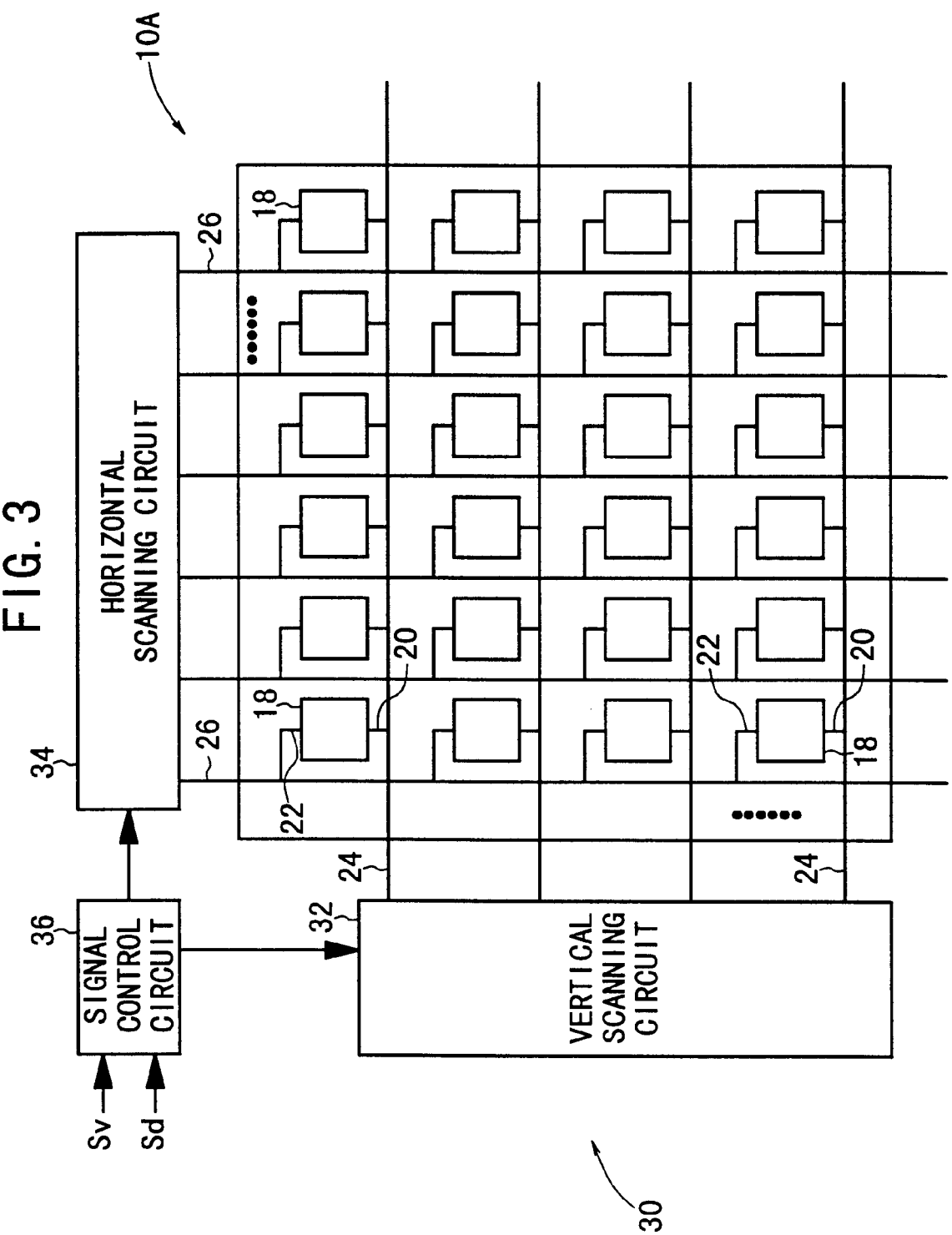
FIG. 3 shows a block diagram illustrating an arrangement of a driving unit used for the display according to the first embodiment.

As shown in FIG. 3, a driving unit 30 for the display 10A comprises a vertical scanning circuit 32 composed of, for example, a shift register for selectively supplying a driving signal to the vertical selection line 24 (connected in series, for example, to the electrode wire 20 arranged for the cavity 18 for each row) to successively select the cavity 18, for example, in the unit of one row, a horizontal scanning circuit 34 composed of, for example, a shift register for outputting a data signal in parallel to the signal line 26 to supply the data signal respectively to the electrode wire 22 of each cavity 18 on a selected column (column of selection), and a signal control circuit 36 for controlling the vertical scanning circuit 32 and the horizontal scanning circuit 34 on the basis of an image signal Sv and a synchronization signal Sd to be inputted.

When the display 10A according to the first embodiment is driven, the image is displayed by allowing the cavity 18 to perform two basic operations (ON selection and OFF selection).

Specifically, the group of picture elements (the group of cavities) are successively selected one row by one row, for example, such that the first row, the second row, . . . and nth row are selected for every scanning period 1H in accordance with the supply of the electric potential to the vertical selection line 24 effected by the vertical scanning circuit 32 on the basis of the input of the image signal Sv and the synchronization signal Sd into the signal control circuit 36. The signal line 26 on the selected row, which relates to the cavity 18 to be subjected to the ON selection, is supplied with the electric potential from the horizontal scanning circuit 34 at a predetermined selection point of time.

As a result, a predetermined voltage, which is sufficient to allow at least one of the gas and the light emitting substance enclosed in the cavity 18 to cause the discharge light emission, is applied between the electrode wires 20, 22 relating to the cavity 18 subjected to the ON selection by the vertical scanning circuit 32 and the horizontal scanning circuit 34. The light is emitted from the concerning cavity 18. The amount of light emission obtained in this situation is changed by the voltage level applied between the electrode wires 20, 22. Therefore, it is possible to perform the gradation control based on the voltage modulation system.

Figure 4:
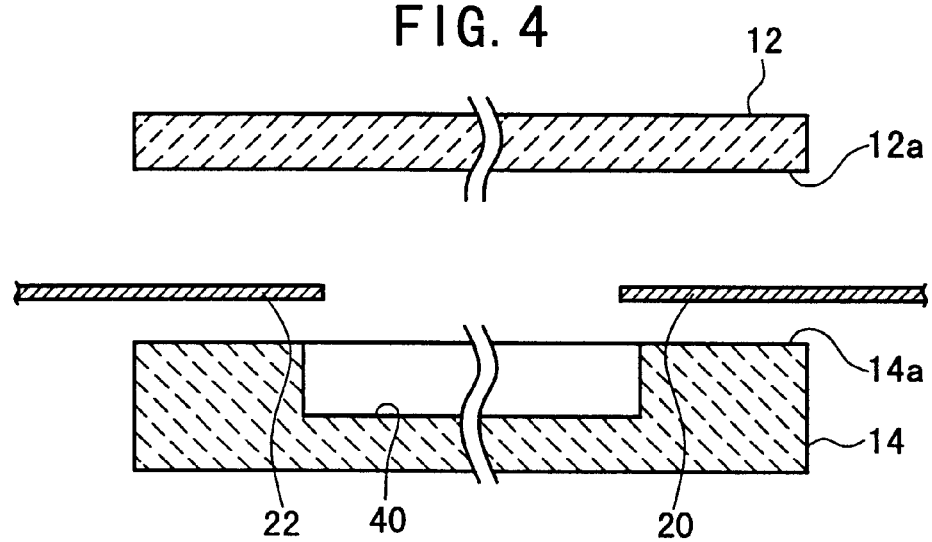
FIG. 4 shows an exploded sectional view illustrating, with partial omission, the arrangement of the display according to the first embodiment.
Figure 5:
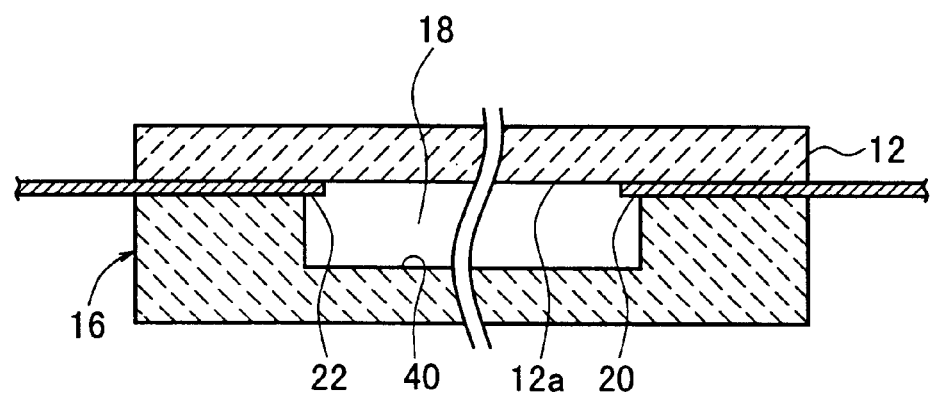
FIG. 5 shows a longitudinal sectional view illustrating, with partial omission, an arrangement of a light emitting element according to the first embodiment.

Components for constructing the display 10A will now be explained with reference to FIGS. 4 to 11. At first, as shown in FIGS. 4 and 5, the upper housing member 12 is formed to have the rectangular plate-shaped configuration. The lower housing member 14 is formed with a recess 40 which has, for example, a rectangular configuration and which is formed at a central portion of its first principal surface 14a.

The upper housing member 12 and the lower housing member 14 are allowed to make contact with each other while confronting the first principal surfaces 12a, 14a with each other to thermally glue them by press under a pressure in a predetermined atmosphere. Thus, the housing 16 (formed product) is manufactured, which has the cavity 18 formed by the recess 40 at the inside. Therefore, the surface portion other than the recess 40, of the first principal surface 14a of the lower housing member 14 functions as the contact surface 14a to make contact with the upper housing member 12.

Before the upper housing member 12 and the lower housing member 14 are allowed to make contact with each other with the first principal surfaces 12a, 14a confronting with each other, for example, a large number of vertical selection lines 24 and signal lines 26 are wired and fixed on the contact surface 14a of the lower housing member 14. The electrode wires 20 for constructing the anodes and the electrode wires 22 for constructing the cathodes are fixed with their respective ends exposed to the recesses 40. Accordingly, when the upper housing member 12 and the lower housing member 14 are thermally glued by press under the pressure with each other, the anode and the cathode, which are formed by the electrode wires 20, 22 respectively for each picture element, are confronted with each other with the cavity 18 interposed therebetween. In this embodiment, in order to ensure the discharge light emission in the cavity 18, it is more preferable to allow the respective ends of the electrode wires to protrude into the cavity 18.

Figure 6:
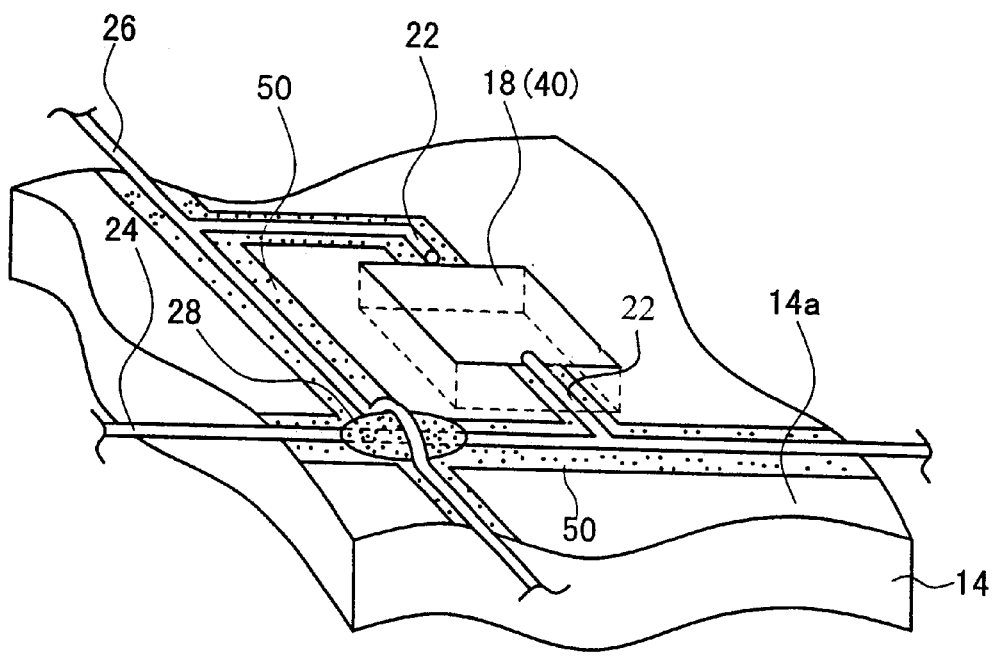
FIG. 6 shows a perspective view illustrating, with partial omission, a first exemplary method for fixing the lead wire on the contact surface of the housing member.
Figure 7:
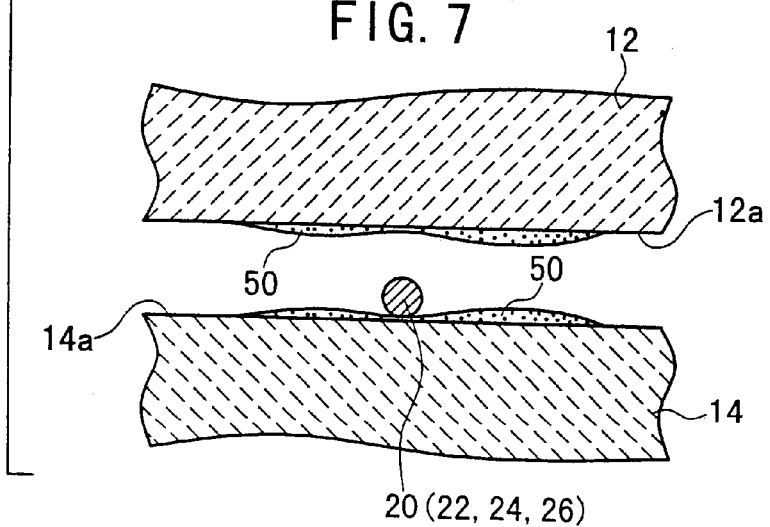
FIG. 7 shows a sectional view illustrating, with partial omission, the first exemplary method for fixing the lead wire on the contact surface of the housing member.
Figure 8:
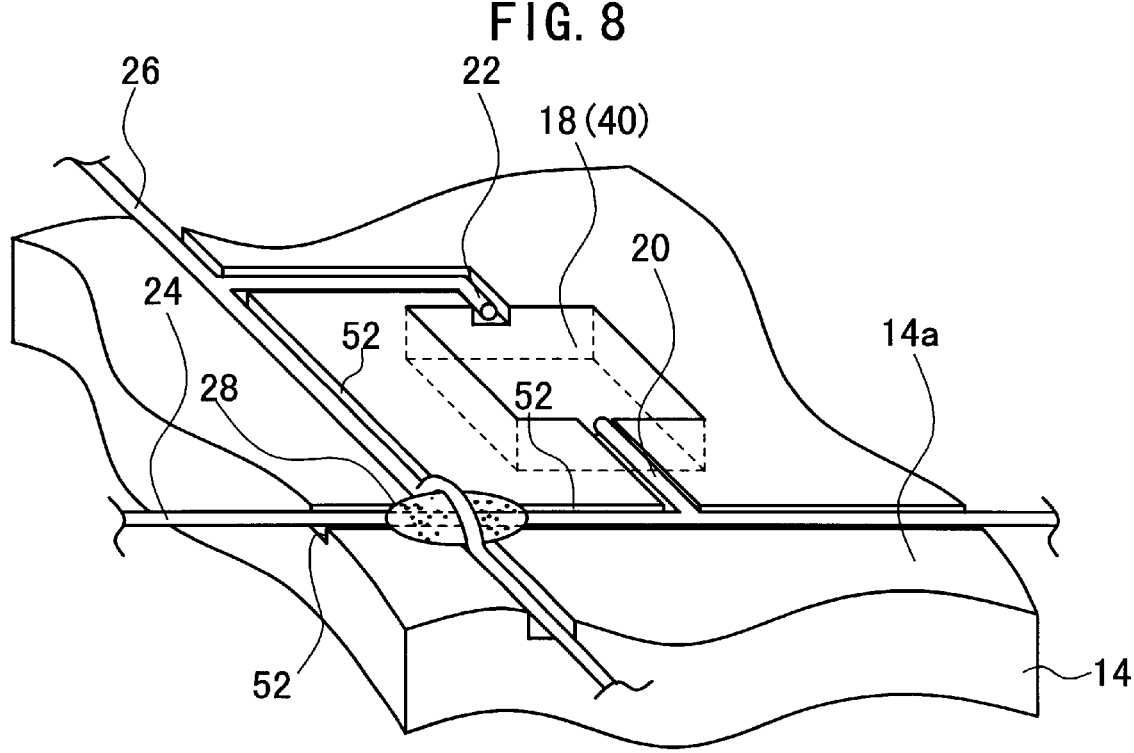
FIG. 8 shows a perspective view illustrating, with partial omission, a second exemplary method for fixing the lead wire on the contact surface of the housing member.
Figure 9:
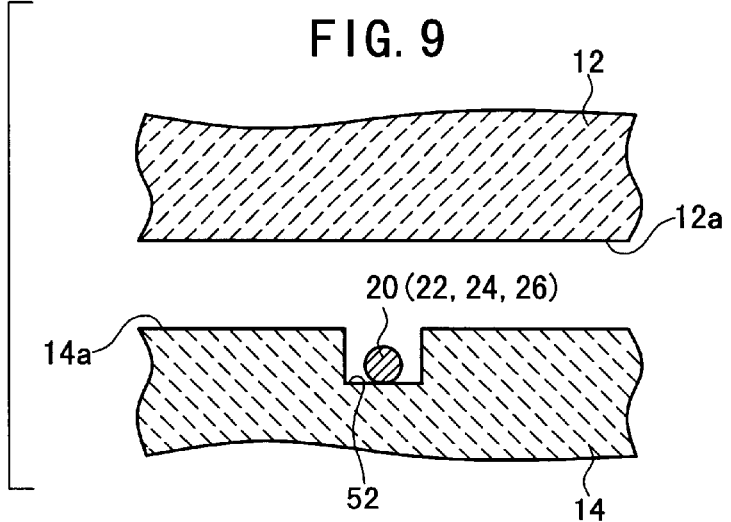
FIG. 9 shows a sectional view illustrating, with partial omission, the second exemplary method for fixing the lead wire on the contact surface of the housing member.
Figure 10:
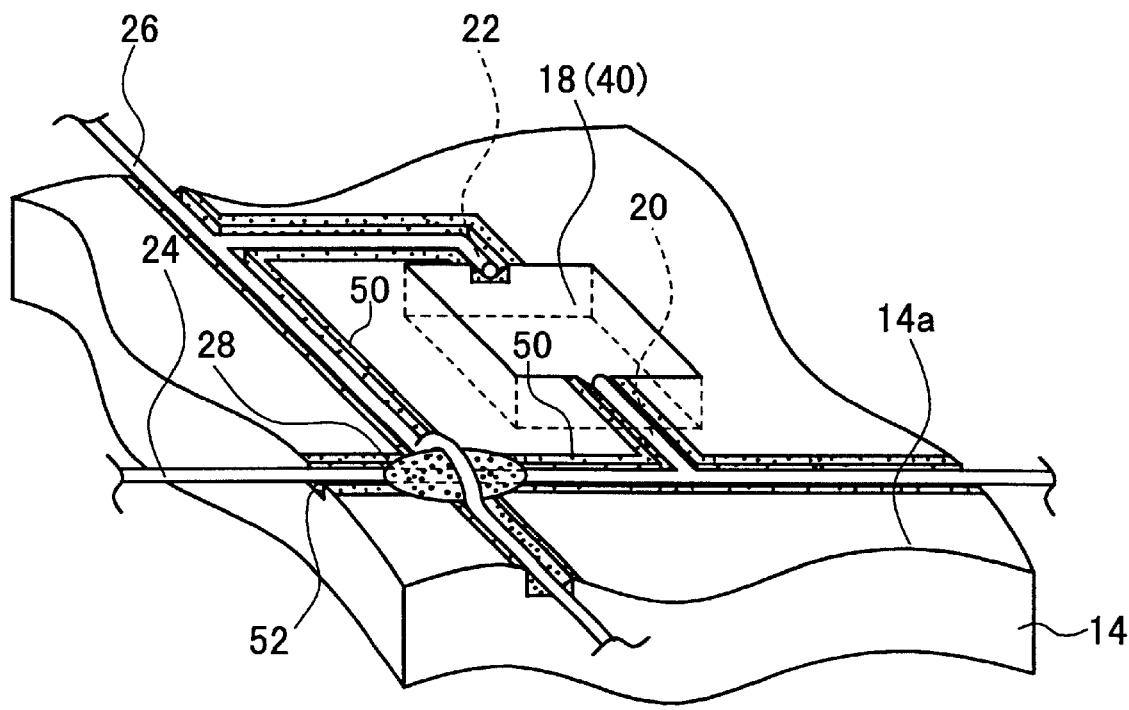
FIG. 10 shows a perspective view illustrating, with partial omission, a third exemplary method for fixing the lead wire on the contact surface of the housing member.
Figure 11:
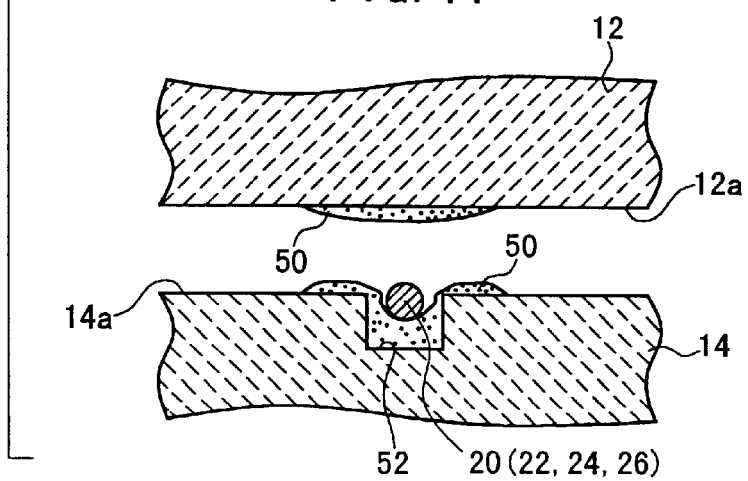
FIG. 11 shows a sectional view illustrating, with partial omission, the third exemplary method for fixing the lead wire on the contact surface of the housing member.

The method for wiring and fixing the vertical selection line 24, the signal line 26, and the electrode wires 20, 22 on the contact surface 14a of the lower housing member 14 includes, for example, a method in which the vertical selection line 24, the signal line 26, and the electrode wires 20, 22 are fixed by the aid of a paste 50 made of a glass material applied to the contact surface 14a as shown in FIGS. 6 and 7, a method in which grooves 52 for lead wires are previously formed at portions for wiring the vertical selection line 24, the signal line 26, and the electrode wires 20, 22, and the vertical selection line 24, the signal line 26, and the electrode wires 20, 22 are arranged and fixed in the grooves 52 respectively as shown in FIGS. 8 and 9, and a method in which the paste 50 made of the glass material is applied to the grooves 52, and the vertical selection line 24, the signal line 26, and the electrode wires 20, 22 are fixed in the grooves 52 as shown in FIGS. 10 and 11. The glass material pastes 28, 50 are preferably a paste having the same composition as that of the glass material for constructing the housing 16, for example, in view of the thermal expansion. More preferably, in order to improve the operability, the melting point of the glass is slightly lowered. When the glass material paste 50 is used, it is preferable that the glass material paste 50 is also applied to the contact surface 12a of the upper housing member 12.

In this embodiment, crystallized glass is used as the glass material for constructing the upper housing member 12 and the lower housing member 14. Specifically, this embodiment uses a glass material having its trade name of "Miraclon" (registered trademark) produced by NGK Insulators, Ltd. Miraclon (registered trademark) includes glass ceramic products (Miraclon PP and Miraclon PH) and a chemical strengthening glass product (Miraclon PC).

The glass ceramic product is obtained such that a blended preparation having a specified composition is melted and glassified at a high temperature, which is formed in the same manner as in the ordinary glass production method, followed by a heat treatment under a specified condition to make conversion into an aggregate composed of a large number of uniform microcrystals. The chemical strengthening glass product is obtained such that the glass surface layer is subjected to ion exchange.

The characteristics will now be briefly explained for the crystallized glass specified by Miraclon (registered trademark).

At first, Miraclon PP is obtained by depositing, in glass, about 1 $\mu$m of microcrystals of lithium disilicate ($Li_2O \cdot 2SiO_2$) and β-spodumene ($Li_2O \cdot Al_2O_3 \cdot 4SiO_2$), and it has the following features. That is, the appearance is white and opaque. Especially, the bending strength is 3500 kgf/cm² which is extremely strong and which is not less than three times those of the glass and the porcelain.

Miraclon PH-1 is obtained by depositing, in glass, about 1 μm of microcrystals of β-spodumene ($Li_2O \cdot Al_2O_3 \cdot 4SiO_2$), and it has the following features. That is, the appearance is white and opaque. The coefficient of thermal expansion is about $11 \times 10^{-7}/°$ C. which is small. Miraclon PH-1 is strong against heat shock.

Miraclon PH-3 is obtained by depositing, in glass, about 1 μm of β-quartz type microcrystals ($Li_2O \cdot Al_2O_3 \cdot 2SiO_2$), and it has the following features. That is, the appearance is colorless and transparent. The coefficient of thermal expansion is substantially zero. Therefore, Miraclon PH-3 is extremely strong against heat shock. Miraclon PH-3 is not broken even when it is red-heated to 800° C. followed by introduction into water at 0° C.

Miraclon PC is chemical strengthening glass obtained by ion exchange of $Li^+ \leftrightarrows Na^+$ for the glass surface layer, and it has the following feature. Especially, the bending strength is 5200 kgf/cm² which is extremely strong.

In the first embodiment, the glass material having the light-transmissive property, for example, Miraclon PH-1 is used for the upper housing member 12, and the glass material having no light-transmissive property, for example, Miraclon PH-3 is used for the lower housing member 14.

As described above, in the display 10A according to the first embodiment, the cavity 18, in which at least one of the gas and the light emitting substance is enclosed, is formed in the housing 16 manufactured such that the upper housing member 12 and the lower housing member 14 composed of the glass material are thermally glued by press under the pressure. The electric power is applied to the anode and the cathode (electrode wires 20, 22) confronting with each other with the cavity 18 interposed therebetween. Thus, the discharge light emission is effected by at least one of the gas and the light emitting substance enclosed in the cavity 18. That is, one cavity 18 functions as one electronic tube.

Especially, in the first embodiment, the large number of cavities 18 are formed and arranged in the single housing 16 in conformity with the number of picture elements. Therefore, the electric power is selectively applied to the large number of electrode wires 20, 22 opposed to one another with the cavities 18 interposed therebetween, in response to the inputted image signal. Thus, the discharge light emission is selectively effected by at least one of the gas and the light emitting substance enclosed in the cavities 18 of the number corresponding to the number of picture elements. Consequently, the image corresponding to the image signal is displayed on the display surface of the housing 16 (the second principal surface of the upper housing member 12 in this embodiment).

In this embodiment, the cavities 18 are formed by the thermal adhesion of the glass members under the pressure. Accordingly, it is possible to integrate the large number of cavities 18 at a high degree of integration, in accordance with which it is also possible to easily realize the miniaturization of the display 10A.

As described above, according to the display 10A concerning the first embodiment, it is possible to simultaneously realize the integration and the miniaturization of the electronic tube, and it is possible to present the display expression for information transmission at a high brightness. Further, it is also contemplated to make application to color display.

Especially, in this embodiment, the upper housing member 12 on the display side, of the housing members 12, 14 for constructing the housing 16 is made of the glass material having the light-transmissive property. Therefore, the display surface of the housing 16 has the light-transmissive property. Accordingly, it is possible to display at a high brightness, the image corresponding to the image signal Sv. Thus, the display 10A is most suitable, for example, as an electronic bulletin board installed at the outdoor.

Figure 12:
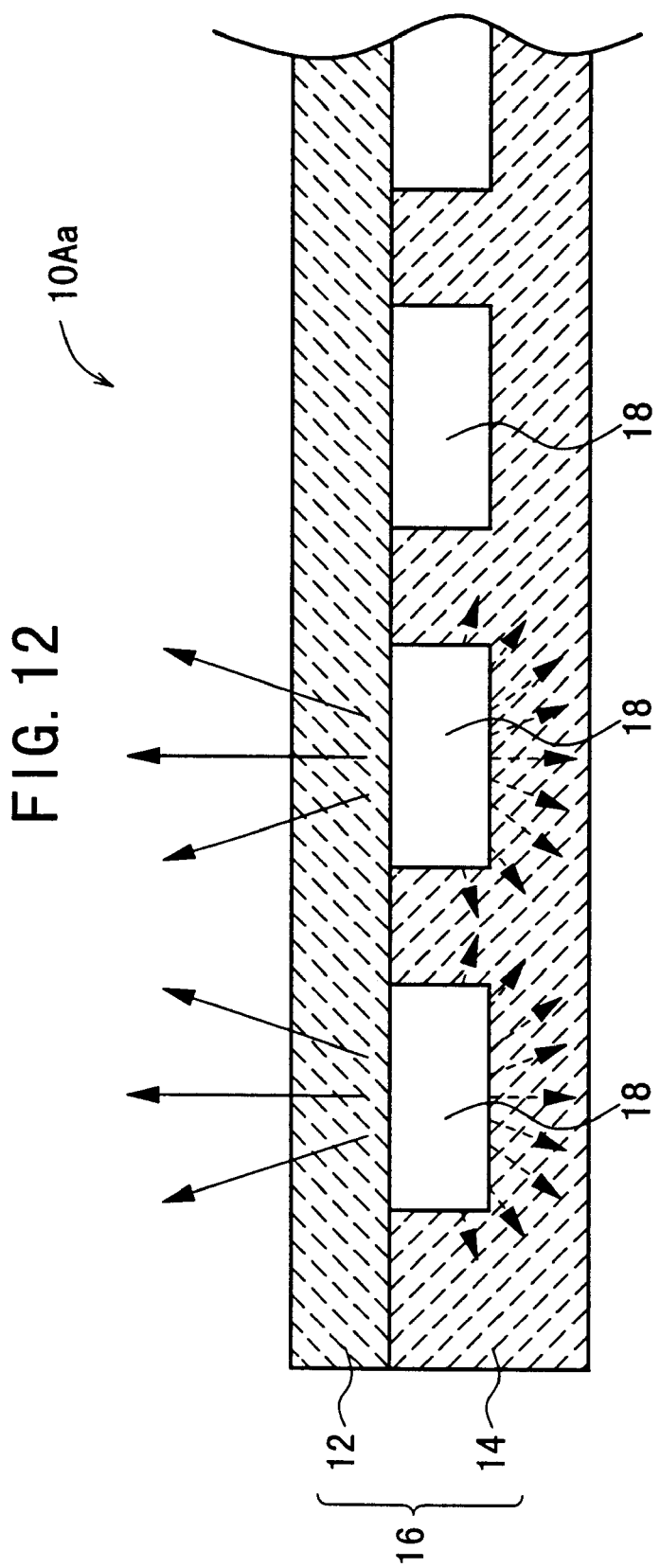
FIG. 12 illustrates the function to avoid the crosstalk between the cavities.

In this embodiment, the lower housing member 14 of the housing members 12, 14 for constructing the housing 16, which does not contribute to the display expression, is made of the glass material having no light-transmissive property. In this arrangement, as shown in FIG. 12, the light components directed to the display surface of the housing 16, which are included in the light components radiated by the discharge light emission effected in the cavities 18, pass through the glass material having the light-transmissive property, and they are radiated to the outside. However, the light components directed to the surfaces other than the display surface of the housing 16 are absorbed by the glass material which has no light-transmissive property. In FIG. 12, the vertical selection line 24, the signal line 26, and the electrode wires 20, 22 are omitted from the illustration.

As a result, it is possible to effectively avoid the crosstalk of light emission, which would be otherwise caused between the cavities 18. Thus, it is possible to effectively avoid the phenomenon which would otherwise result in the deterioration of image quality such as the image disturbance and the afterimage phenomenon.

Further, the display 10A according to the first embodiment uses the glass material having the bending strength of not less than 1000 kgf/cm² as the glass material for constructing the upper housing member 12 and the lower housing member 14. Therefore, it is possible to obtain the following effects.

That is, in order to improve the resolution of the display expression, it is necessary to increase the number of cavities 18 which function as electronic tubes. However, considering the miniaturization, it is conceived that the respective cavities 18 are reduced in size.

If the size of the respective cavities 18 is reduced, the pressure in the cavity 18 is increased during the light emission in accordance therewith. However, when the glass member satisfies the bending strength as described above, the formed product (housing 16) is obtained, which is sufficiently capable of withstanding the pressure in the cavity 18. Thus, it is possible to avoid the inconvenience such as the light emission defect.

The glass material having a bending strength of about 1000 kgf/cm² is used for the display in which, for example, argon or mercury is enclosed in the cavity. The glass material having a bending strength of about 3000 kgf/cm² is preferably used for the display in which the gas such as xenon to obtain a high brightness is enclosed in the cavity.

The display 10A according to the first embodiment is allowed to use the glass material in which the coefficient of thermal expansion is substantially zero, or it is near to the coefficient of thermal expansion of the electrode material for constructing, for example, the electrode wire. In this arrangement, the heat resistance is excellent, and the display 10A is advantageous in resistance to the heat cycle relevant to the repetition of discharge light emission of at least one of the gas and the light emitting substance enclosed in the cavity 18.

Figure 13:
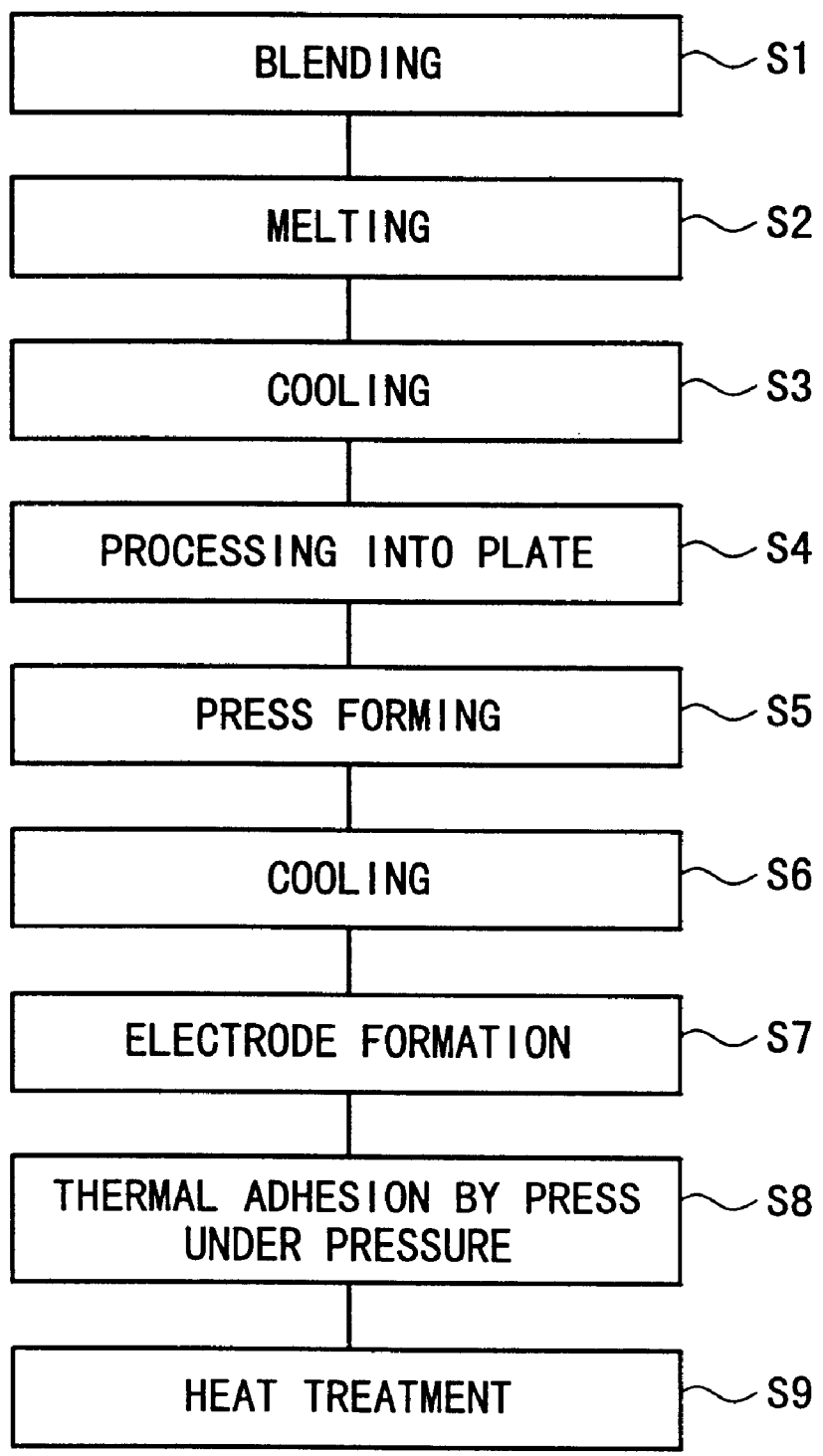
FIG. 13 shows a block diagram depicting steps of a method for producing the display according to the first embodiment.

Next, a method for producing the light emitting element 10A according to the first embodiment will be explained with reference to a flow chart shown in FIG. 13.

At first, in the step S1, various composition components are blended in order to obtain the desired crystallized glass. For example, when Miraclon PP-1 and Miraclon PP-4 are obtained, the blending is carried out to give 79% by weight of $SiO_2$, 6.0% by weight of $Al_2O_3$, 12.5% by weight of $Li_2O$, 2.5% by weight of $K_2O$, 3.0% by weight of $P_2O_5$, and 0.3% by weight of $As_2O_3$.

When Miraclon PH-1, Miraclon PH-3, and Miraclon PH-4 are obtained, the blending is carried out to give 65.7% by weight of $SiO_2$, 22.7% by weight of $Al_2O_3$, 4.2% by weight of $Li_2O$, 0.5% by weight of $Na_2O$, 0.3% by weight of $K_2O$, 1.4% by weight of $P_2O_5$, 0.5% by weight of $MgO$, 1.7% by weight of $TiO$, 0.9% by weight of $As_2O_3$, 2.4% by weight of $ZrO_2$, and 0.2% by weight of $Sb_2O_3$.

When Miraclon PC-4 is obtained, the blending is carried out to give 62.9% by weight of $SiO_2$, 17.2% by weight of $Al_2O_3$, 3.5% by weight of $Li_2O$, 5.8% by weight of $Na_2O$, 1.9% by weight of $CaF_2$, 1.0% by weight of $TiO$, 7.7% by weight of $B_2O_3$, and 0.3% by weight of $As_2O_3$.

Subsequently, in the step S2, the blended preparation is heated and melted at a temperature of 1400 to 1500° C. Subsequently, in the step S3, the melted blended preparation is quenched and quickly cooled with water, oil or the like without causing crystallization in the same manner as in the ordinary glass production method. After that, in the step S4, the cooled blended preparation is processed to have a plate-shaped configuration to prepare a source plate for the upper housing member 12 and the lower housing member 14.

Figure 14:
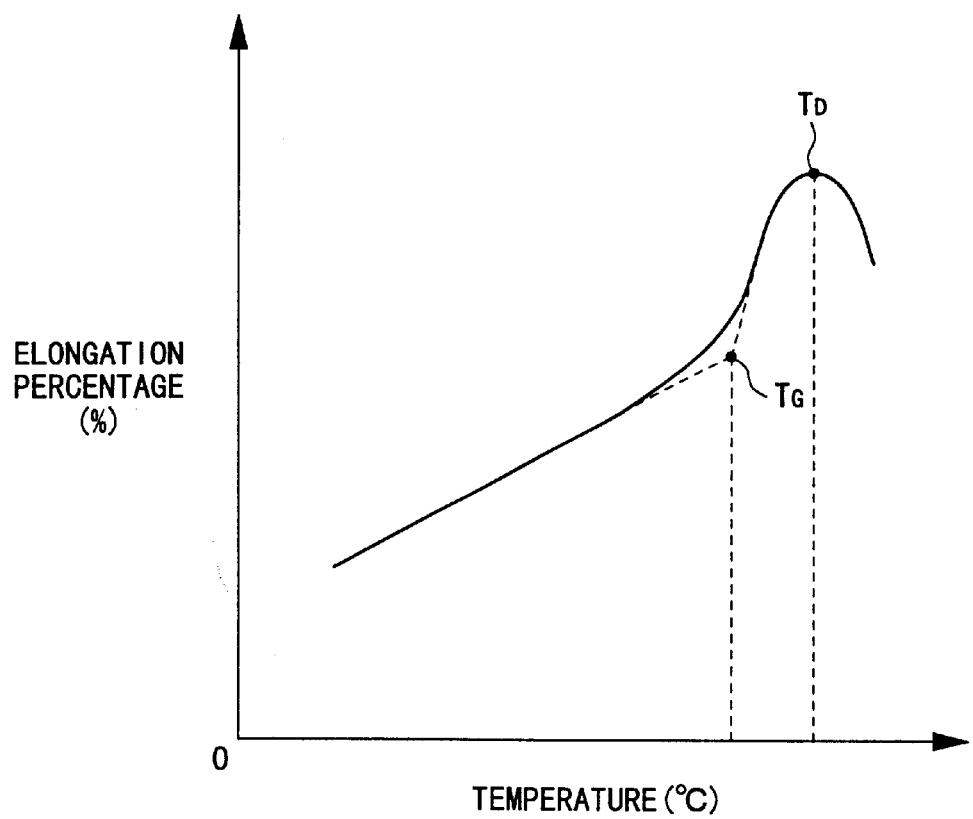
FIG. 14 shows a characteristic curve illustrating the forming temperature for the glass member and the elongation percentage of the glass member.

Subsequently, in the step S5, the source plate is press-formed to produce the plate-shaped upper housing member 12 and the lower housing member 14 having the recess 40 at the central portion of the first principal surface is 14a. The press forming is performed at a temperature of not less than a softening point Ts of the source plate. The softening point Ts is a temperature at which the viscosity of the source plate is $4.5 \times 10^7$ poise. In this embodiment, as shown in FIG. 14, for example, the process is carried out at a temperature which is higher by about 40° C. to 50° C. than the yield temperature $T_d$ at which the elongation percentage is maximum. $T_G$ in FIG. 14 represents the temperature at which the melted glass begins to be solidified, i.e., the transition temperature.

Subsequently, in the step S6 shown in FIG. 13, the upper housing member 12 and the lower housing member 14, which have been manufactured by the press forming described above, are cooled, for example, to the room temperature. After that, in the step S7, the vertical selection line 24, the signal line 26, and the electrode wires 20, 22 are wired and fixed, for example, on the contact surface 14a of the lower housing member 14. As described above, the method for fixing the vertical selection line 24, the signal line 26, and the electrode wires 20, 22 includes, for example, a method in which the vertical selection line 24, the signal line 26, and the electrode wires 20, 22 are fixed by the aid of the paste 50 made of the glass material applied to the contact surface 14a of the lower housing member 14 (see FIGS. 6 and 7), a method in which the grooves 52 for lead wires are previously formed on the contact surface 14a of the lower housing member 14, and the vertical selection line 24, the signal line 26, and the electrode wires 20, 22 are arranged and fixed in the grooves 52 respectively (see FIGS. 8 and 9), and a method in which the paste 50 made of the glass material is applied to the grooves 52, and the vertical selection line 24, the signal line 26, and the electrode wires 20, 22 are fixed in the grooves 52 (see FIGS. 10 and 11).

Subsequently, in the step S8, the upper housing member 12 and the lower housing member 14 are allowed to make contact with each other with their first principal surfaces (contact surfaces) 12a, 14a opposing to one another to thermally glue them by press under a pressure in a predetermined atmosphere, for example, a xenon atmosphere at a high pressure (1 to 20 atms). Thus, the housing 16 is manufactured, which includes, at its inside, the cavities 18 formed by the first principal surface 12a of the upper housing member 12 and the recesses 40 of the lower housing member 14. The press thermal gluing process under the pressure is also performed at a temperature which is higher by about 40° C. to 50° C. than the yield temperature $T_D$, in the same manner as in the press forming performed in the step S5.

Subsequently, in the step S9, the heat treatment is performed in order that the crystalline nucleuses are generated in the manufactured housing 16 to cause crystallization. Thus, the display 10A according to the first embodiment is produced.

Figure 15:
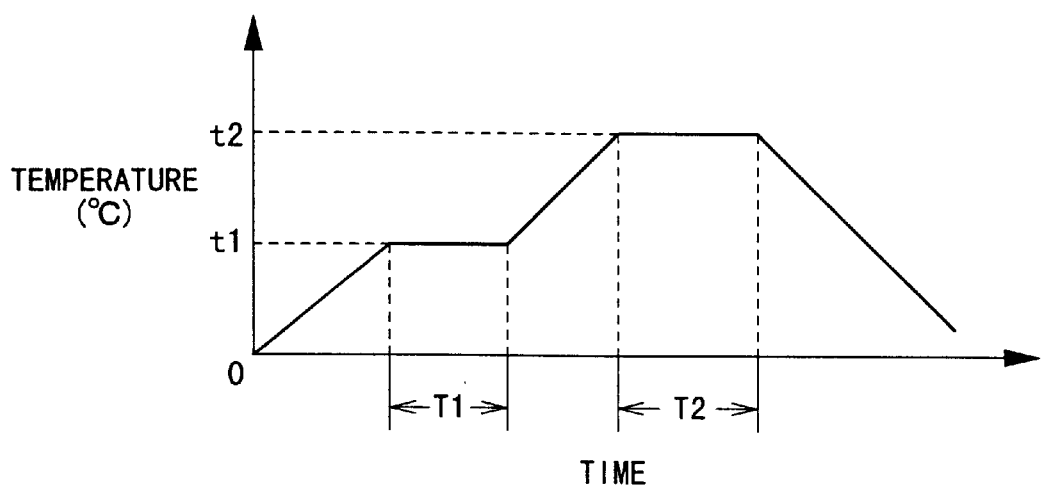
FIG. 15 shows a graph illustrating a time schedule for the heat treatment performed to cause crystallization.

An example of the heat treatment will be explained. As shown in FIG. 15, the temperature is raised from the room temperature to the primary crystallization temperature t1 at a temperature-raising speed of 50° C. to 200° C./hour, followed by being held for a certain period of time T1. Accordingly, the crystalline nucleuses are formed in the housing 16. After that, the temperature is raised to the secondary crystallization temperature t2 at a temperature-raising speed of 50° C. to 200° C./hour, followed by being held for a certain period of time T2. Accordingly, the crystals grow in the housing 16. Subsequently, the temperature is lowered to the room temperature at a temperature-lowering speed of, for example, 50° C. to 200° C. /hour.

The application of the heat treatment for the purpose of crystallization as described above allows the housing 16 to be converted into an aggregate of a large number of uniform microcrystals. As a result, it is possible to obtain the high bending strength which is not less than three times that of the glass.

Next, several modified embodiments of the display 10A according to the first embodiment will be explained with reference to FIGS. 16 to 20.

Figure 16:
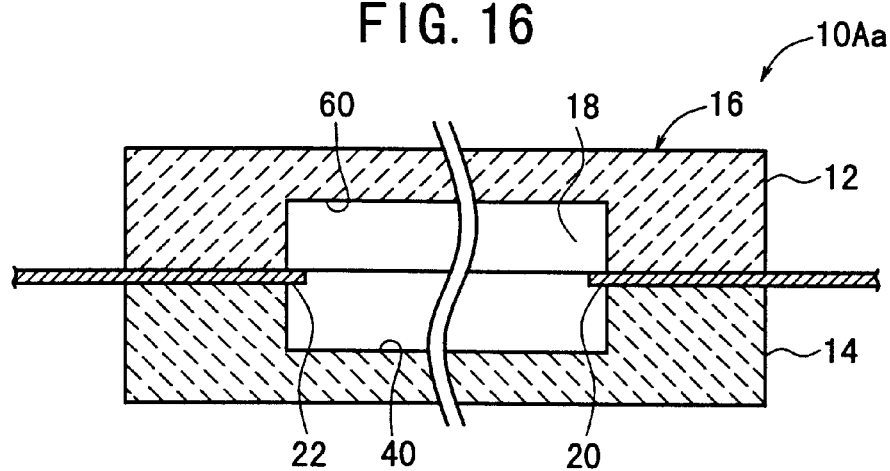
FIG. 16 shows a longitudinal sectional view illustrating, with partial omission, a first modified embodiment of the display according to the first embodiment.

At first, as shown in FIG. 16, a display 10Aa according to a first modified embodiment comprises a recess 60 provided on the upper housing member 12 as well. In this embodiment, the cavity 18 is formed by the recess 60 of the upper housing member 12 and the recess 40 of the lower housing member 14.

Figure 17:
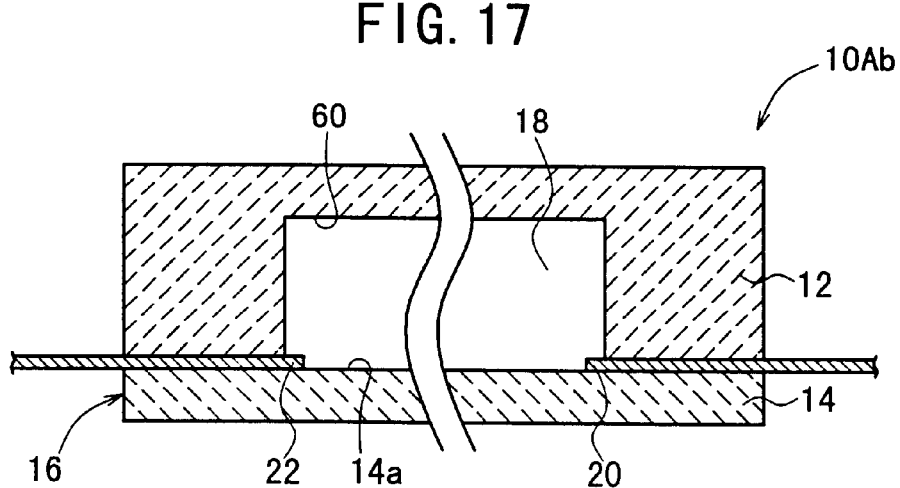
FIG. 17 shows a longitudinal sectional view illustrating, with partial omission, a second modified embodiment of the display according to the first embodiment.

Next, as shown in FIG. 17, a display 10Ab according to a second modified embodiment comprises a recess 60 provided on only the upper housing member 12. In this embodiment, the cavity 18 is formed by the recess 60 and the first principal surface 14a of the lower housing member 14.

Figure 18:
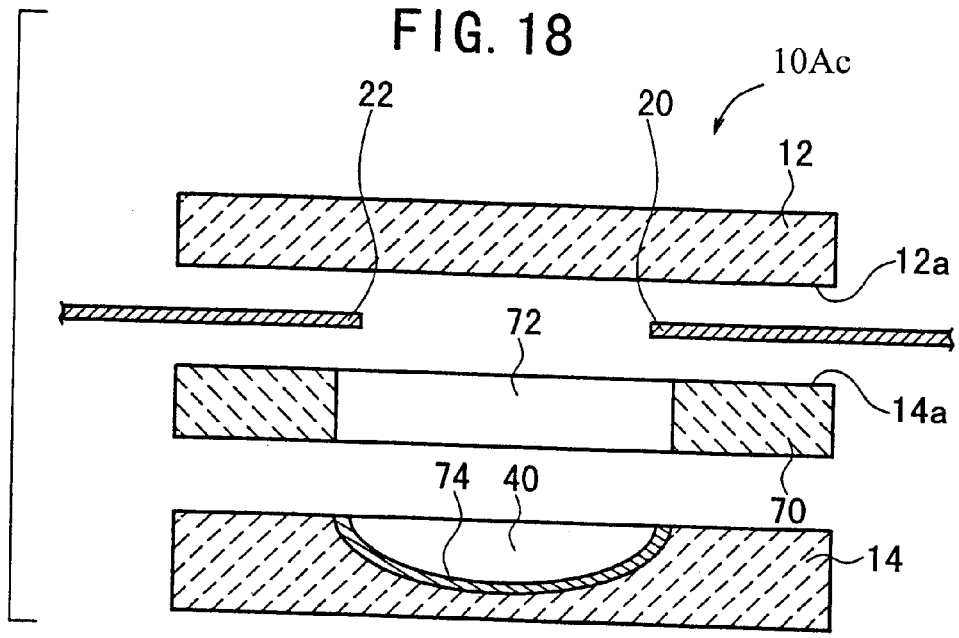
FIG. 18 shows an exploded sectional view illustrating, with partial omission, a third modified embodiment of the display according to the first embodiment.

Next, as shown in FIG. 18, a display 10Ac according to a third modified embodiment comprises three stacked housing members. The upper housing member 12 is formed to have a rectangular plate-shaped configuration. The lower housing member 14 has a rectangular contour, and it includes, for example, a hemispherical or parabola-shaped recess 40 formed at a central portion of its first principal surface 14a. The central housing member 70 has a rectangular contour, and it has a hollow section 72 having approximately the same diameter as the maximum diameter of the recess 40.

Figure 19:
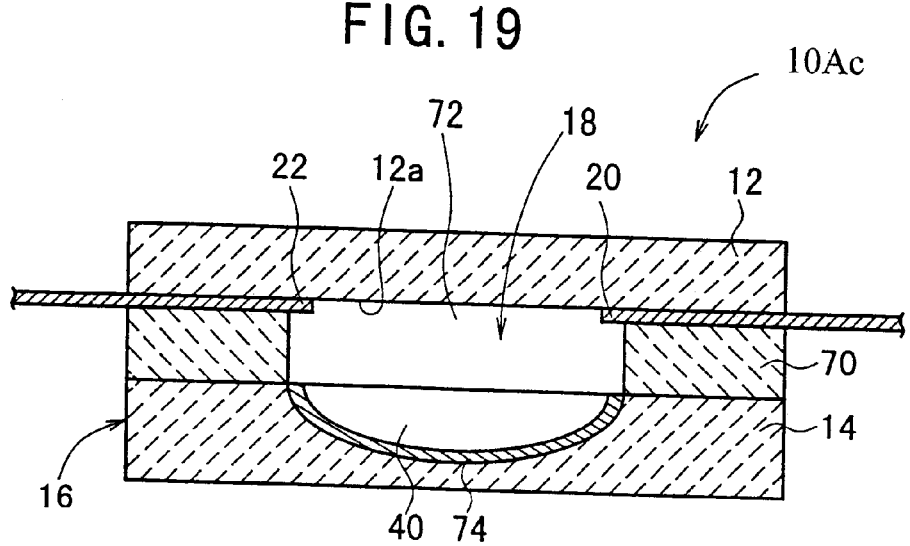
FIG. 19 shows a longitudinal sectional view illustrating, with partial omission, the third modified embodiment of the display according to the first embodiment.

In this embodiment, as shown in FIG. 19, the cavity 18 is formed by the recess 40 of the lower housing member 14, the hollow section 72 of the central housing member 70, and the first principal surface 12a of the upper housing member 12.

Further, in the third modified embodiment, a light-reflective film 74, which is made of, for example, aluminum, is formed, for example, by sputtering on the inner wall surface of the recess 40 of the lower housing member 14.

Accordingly, in the display 10Ac according to the third modified embodiment, the light components directed to the display surface of the housing 16, of the light components radiated by the discharge light emission effected in the cavity 18 pass through the glass material having the light-transmissive property, and they outgo to the outside. However, the light components directed to the surfaces other than the display surface of the housing 16 are reflected by the light-reflective film 74. As a result, almost all of the light components generated in the cavity 18 are directed to the display surface of the housing 16. Thus, it is possible to achieve a higher brightness. Also in this embodiment, it is possible to effectively avoid the crosstalk of light emission, which would be otherwise caused between the cavities 18. Thus, it is possible to effectively avoid the phenomenon which would otherwise result in the deterioration of image quality such as the image disturbance and the afterimage phenomenon.

In the display 10Ac according to the third embodiment, it is preferable that the glass material having the light-transmissive property is used for the upper housing member 12, and the glass material having no light-transmissive property is used for the central housing member 70. As for the lower housing member 14, the light-transmissive property of the glass material is irrelevant thereto, because the light-reflective film 74 is formed on the recess 40.

A process for producing the display 10Ac according to the third embodiment will now be explained with reference to FIG. 20.

At first, the steps S101 to S103 are approximately the same as the steps S1 to S3 in the method for producing the display 10A according to the first embodiment described above. In the step S101, various composition components are blended in order to obtain desired crystallized glass. In the next step S102, the blended preparation is heated and melted at a temperature of 1400° C. to 1500° C. Subsequently, in the step S103, the melted blended preparation is quenched and quickly cooled with water, oil or the like without causing crystallization in the same manner as in the ordinary glass production method.

In the step S104, the cooled blended preparation is processed to have a plate-shaped configuration to prepare three types of source plates, i.e., source plates for the upper housing member 12, the central housing member 70, and the lower housing member 14 respectively.

Subsequently, in the step S105, the source plates are press-formed to produce the plate-shaped upper housing member 12, the central housing member 70 having the hollow section 72 in the axial direction, and the lower housing member 14 having the recess 40 at the central portion of the first principal surface 14a.

Subsequently, in the step S106, the upper housing member 12 and the lower housing member 14, which have been manufactured by the press forming as described above, are cooled, for example, to the room temperature. After that, in the step S107, the light-reflective film 74 is formed, for example, by means of the sputtering method on the inner wall surface of the recess 40 of the lower housing member 14.

Subsequently, in the step S108, the vertical selection line 24, the signal line 26, and the electrode wires 20, 22 are wired and fixed, for example, on the contact surface of the central housing member 70 to make contact with the upper housing member 12.

Subsequently, in the step S109, the upper housing member 12, the central housing member 70, and the lower housing member 14 are successively stacked, and they are thermally glued with each other by press under a pressure in a predetermined atmosphere, for example, in a xenon atmosphere at a high pressure (1 to 20 atms). Thus, the housing 16 is manufactured, which includes, at its inside, the cavity 18 formed by the first principal surface 12a of the upper housing member 12, the hollow section 72 of the central housing member 70, and the recess 40 of the lower housing member 14.

Subsequently, in the step S110, the heat treatment is performed in order that the crystalline nucleuses are generated in the manufactured housing 16 to cause crystallization. Thus, the display 10Ac according to the third modified embodiment is produced.

Next, a display 10B according to the second embodiment will be explained with reference to FIGS. 21 to 27. Components or parts corresponding to those shown in FIGS. 1 to 11 are designated by the same reference numerals, duplicate explanation of which will be omitted.

Figure 21:
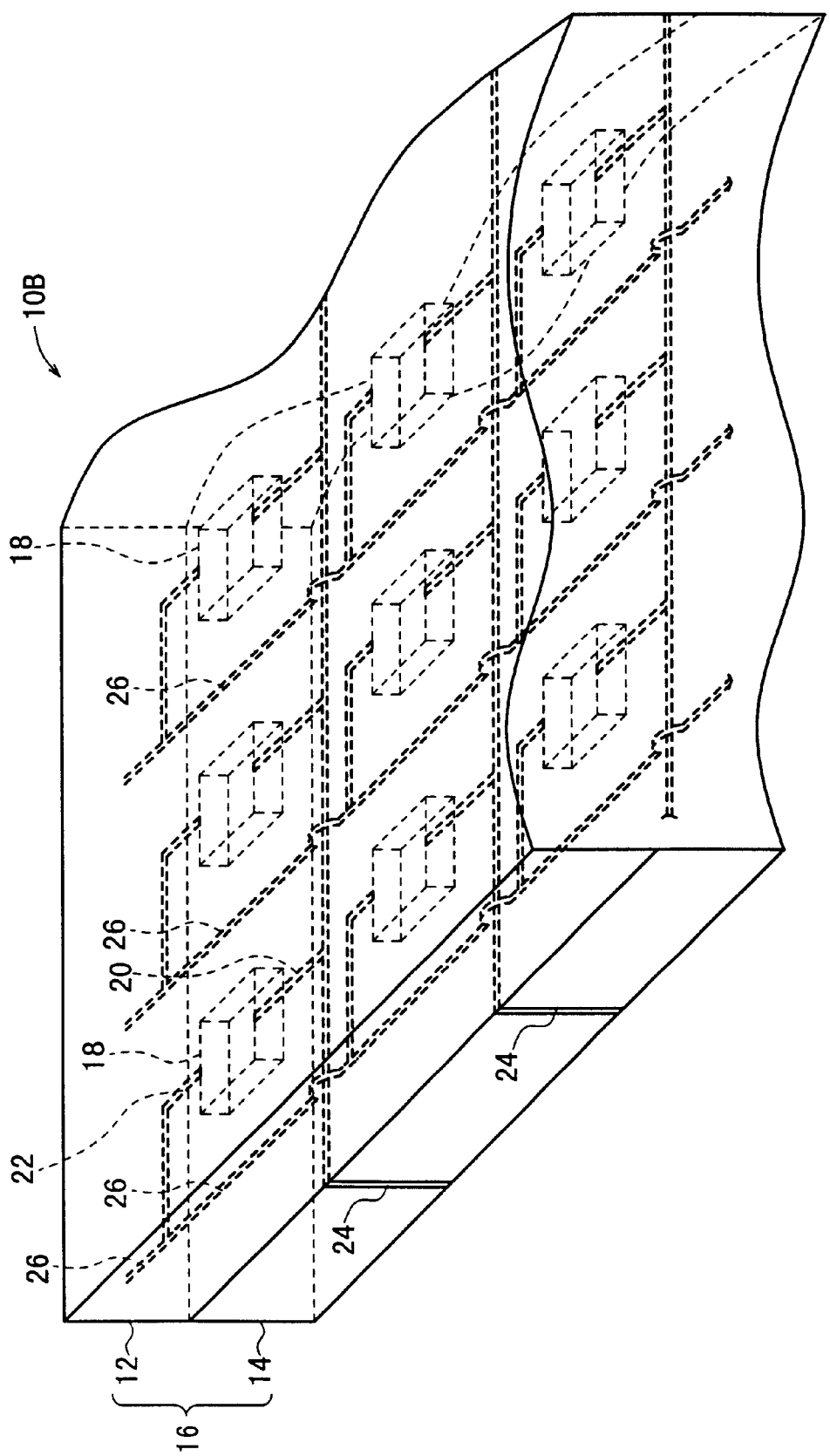
FIG. 21 shows a perspective view illustrating an arrangement of a display according to a second embodiment.
Figure 22:
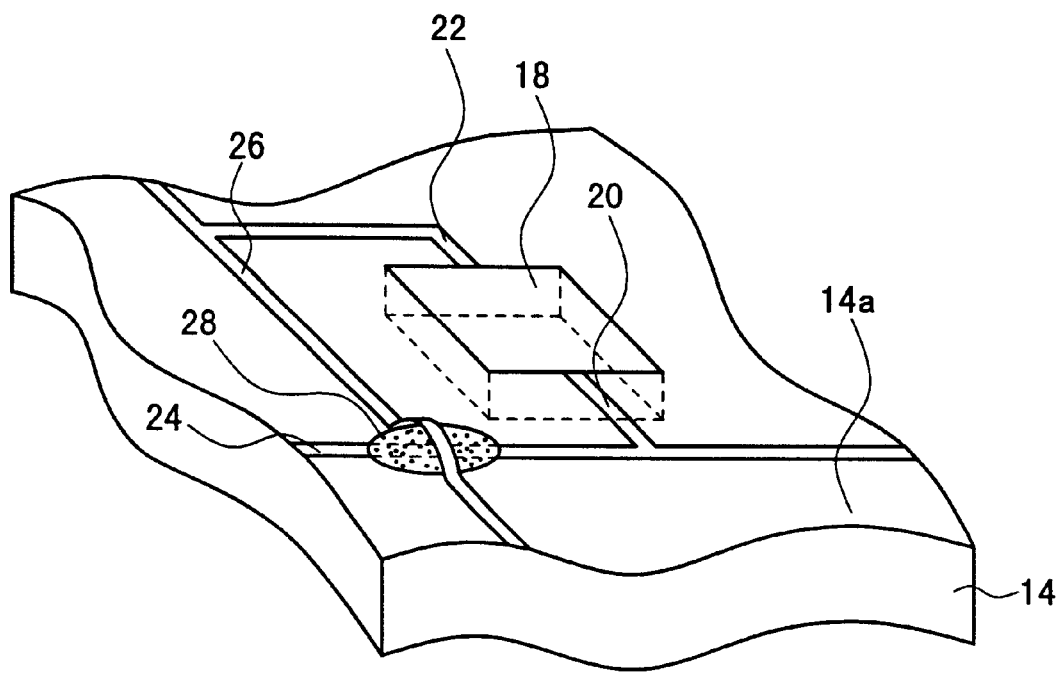
FIG. 22 shows a perspective view illustrating, with partial omission, a wiring arrangement state of the display according to the second embodiment.
Figure 23:
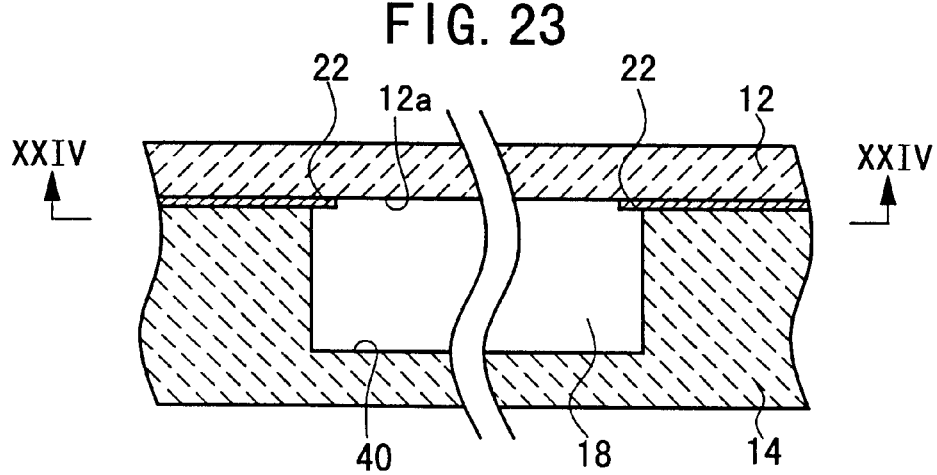
FIG. 23 shows a longitudinal sectional view illustrating, with partial omission, the display according to the second embodiment.

As shown in FIGS. 21 to 23, the display 10B according to the second embodiment is constructed in approximately the same manner as the display 10A according to the first embodiment described above (see FIG. 1). However, the former is different from the latter in that the vertical selection line 24, the signal line 26, and the electrode wires 20, 22 are not constructed by the lead wires, but they are constructed by thin film patterns containing metal. Especially, in the second embodiment, in order to facilitate the connection to the vertical scanning circuit 32 and the horizontal scanning circuit 34 of the driving unit 30 (see FIG. 3), the respective thin film patterns for constructing the vertical selection line 24 and the signal line 26 are formed over the contact surface 14a to the outer circumferential surface of the lower housing member 14.

Figure 24:
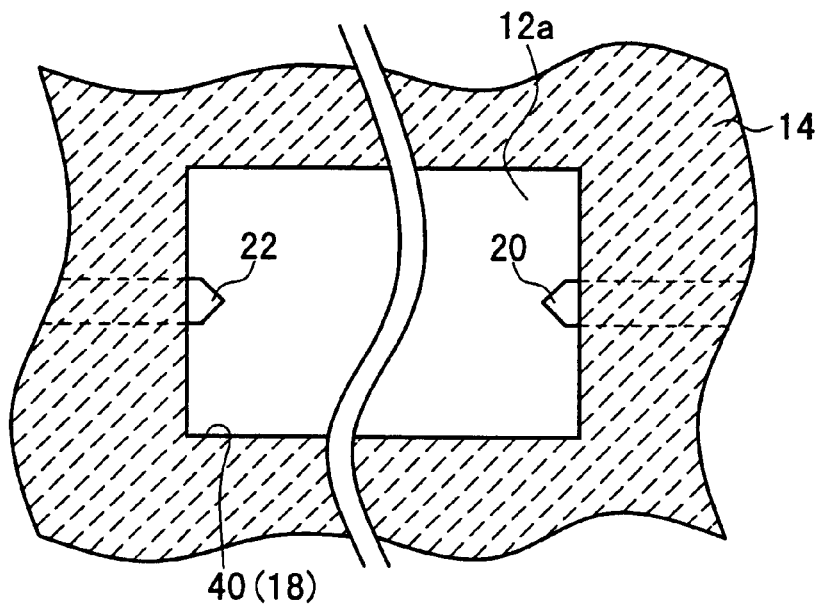
FIG. 24 shows a sectional view taken along a line XXIV—XXIV shown in FIG. 23.

Further, as shown in FIG. 24, forward ends of the electrode wires 20, 22 based on the thin film pattern may be formed to have a sharp configuration. This arrangement is preferred in that the discharge efficiency is improved.

The method for forming the vertical selection line 24, the signal line 26, and the electrode wires 20, 22 based on the thin film pattern on the contact surface 14a of the lower housing member 14 includes, for example, a method in which they are formed by printing a paste based on the use of a glass powder and a high melting point metal (for example, tungsten and molybdenum), and a method in which they are formed by using a sheet member comprising a metal foil formed on, for example, a film-shaped resin strip to stick the metal foil of the sheet member, for example, to the contact surface 14a of the lower housing member 14, followed by peeling off the resin strip other than the metal foil.

As shown in FIG. 22, when the vertical selection line 24 and the signal line 26 are arranged and wired, the paste 28 made of glass material is formed at the portion of intersection between the vertical selection line 24 and the signal line 26 so that the vertical selection line 24 is insulated from the signal line 26.

Also in the display 10B according to the second embodiment, it is possible to simultaneously realize the integration and the miniaturization of the electronic tube, and it is possible to make the display expression for information transmission at a high brightness, in the same manner as in the display 10A according to the first embodiment.

Especially, in the display 10B according to the second embodiment, the vertical selection line 24, the signal line 26, and the electrode wires 20, 22 are constructed by using the thin film pattern. Therefore, the labor for the wiring arrangement is reduced, and it is possible to simplify the production steps, as compared with the case in which the vertical selection line 24, the signal line 26, and the electrode wires 20, 22 are constructed by using the lead wires. Further, the positioning can be easily achieved in order that the electrode wires 20, 22 are opposed to one another with the cavity 18 interposed therebetween.

Next, a method for producing the display 10B according to the second embodiment will be explained. This production method is carried out by executing approximately the same steps as those of the method for producing the display 10A according to the first embodiment shown in FIG. 13. However, the former is different from the latter in that the vertical selection line 24, the signal line 26, and the electrode wires 20, 22 are formed in the electrode formation in the step S7 not by arranging the lead wire but by adopting, for example, the method based on the printing or the method based on the use of the sheet member as described above.

Figure 25:
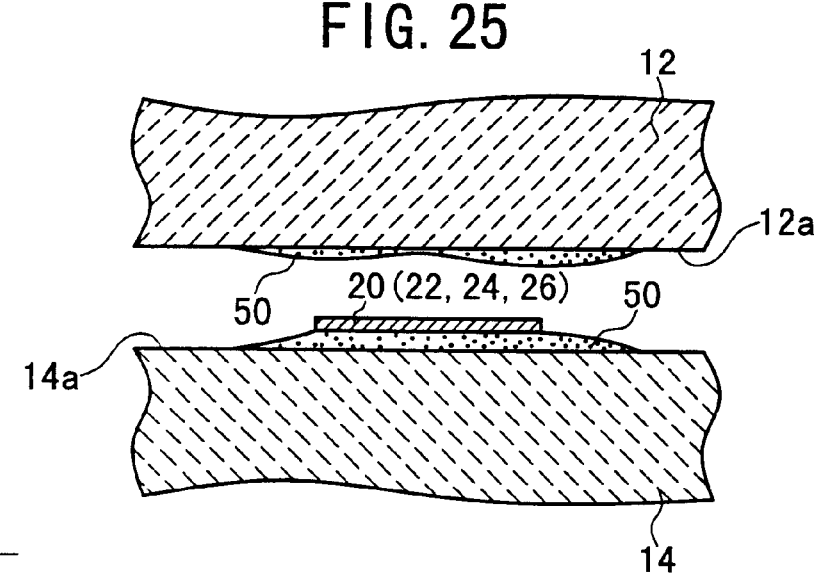
FIG. 25 shows a sectional view illustrating, with partial omission, a first exemplary method for forming a thin film pattern on the contact surface of the housing member.
Figure 26:
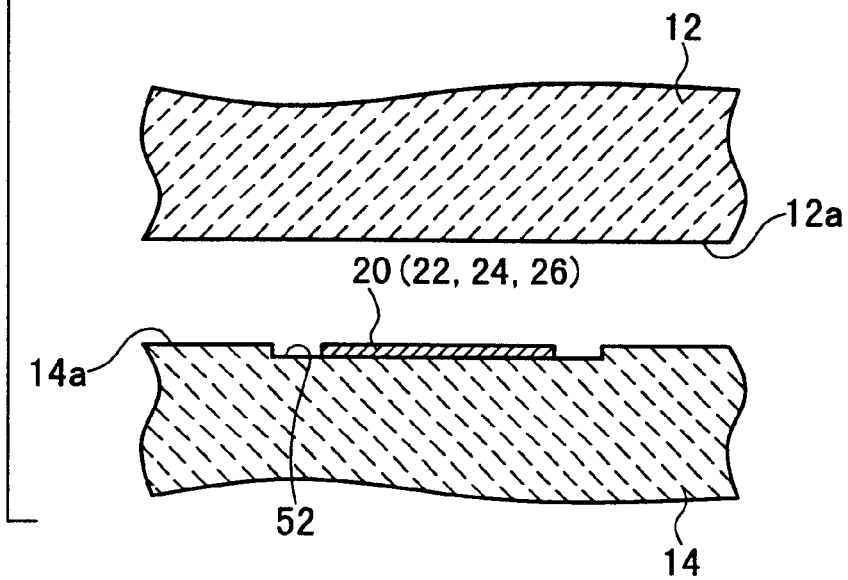
FIG. 26 shows a sectional view illustrating, with partial omission, a second exemplary method for forming a thin film pattern on the contact surface of the housing member.
Figure 27:
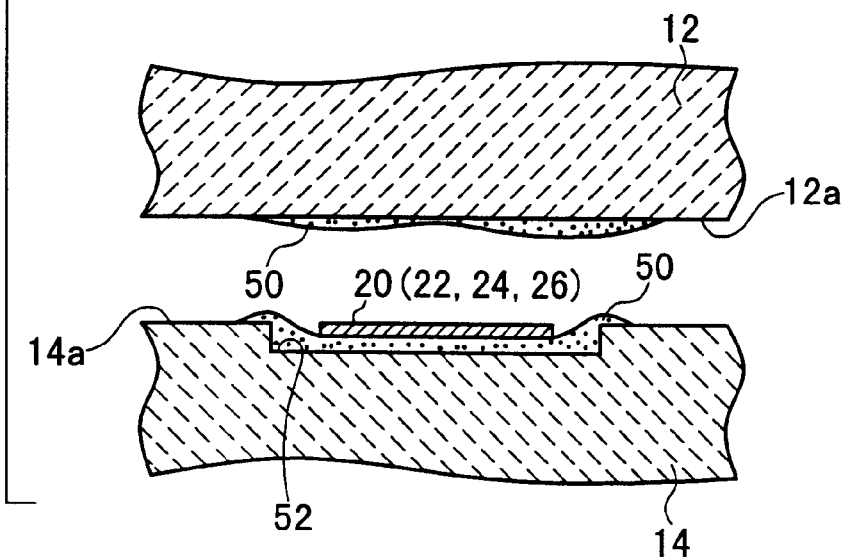
FIG. 27 shows a sectional view illustrating, with partial omission, a third exemplary method for forming a thin film pattern on the contact surface of the housing member.

In this embodiment, it is possible to adopt, for example, a method in which the vertical selection line 24, the signal line 26, and the electrode wires 20, 22 based on the thin film are formed, for example, by means of printing by the aid of a paste 50 made of glass material applied to the contact surface 14a of the lower housing member 14 as shown in FIG. 25, a method in which a groove 52 for the thin film pattern is previously formed, for example, on the contact surface 14a of the lower housing member 14 so that the vertical selection line 24, the signal line 26, and the electrode wires 20, 22 based on the thin film pattern are formed in the groove 52 as shown in FIG. 26, and a method in which the paste 50 made of glass material is applied to the groove 52 and then the vertical selection line 24, the signal line 26, and the electrode wires 20, 22 based on the thin film pattern are formed as shown in FIG. 27.

Next, several modified embodiments of the display 10B according to the second embodiment will be explained with reference to FIGS. 28 to 31.

At first, as shown in FIG. 28, a display 10Ba according to a first modified embodiment comprises a recess 60 provided on the upper housing member 12 as well. In this embodiment, the cavity 18 is formed by the recess 60 of the upper housing member 12 and the recess 40 of the lower housing member 14.

Next, as shown in FIG. 29, a display 10Bb according to a second modified embodiment comprises a recess 60 provided on only the upper housing member 12. In this embodiment, the cavity 18 is formed by the recess 60 and the first principal surface 14a of the lower housing member 14.

Figure 30:
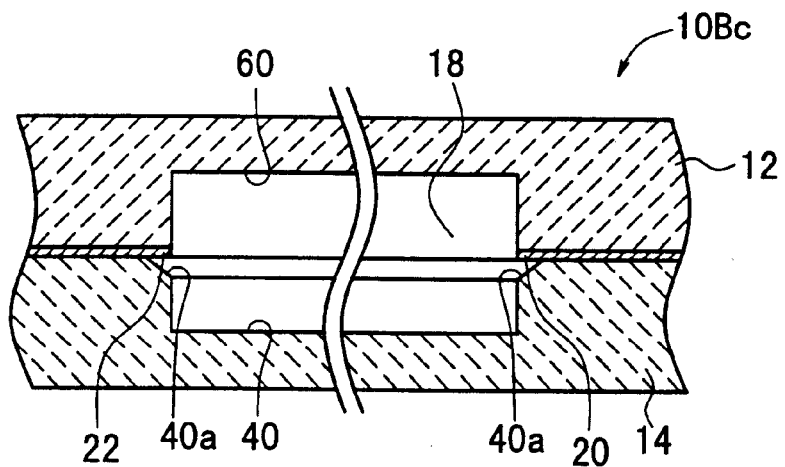
FIG. 30 shows a longitudinal sectional view illustrating, with partial omission, a third modified embodiment of the display according to the second embodiment.

Next, as shown in FIG. 30, a display 10Bc according to a third modified embodiment is based on the display 10Ba according to the first modified embodiment. However, the former is different from the latter in that a tapered surface 40a is formed at the circumferential edge of the recess 40 of the housing member (the lower housing member 14 in the illustrated embodiment) on which the vertical selection line 24, the signal line 26, and the electrode wires 20, 22 based on the thin film pattern are not formed, of the upper housing member 12 and the lower housing member 14.

In this embodiment, it is possible to avoid the inconvenience which would otherwise occur such that the glass component of the lower housing member 14 covers the forward ends of the electrode wires 20, 22 constructed by the thin film pattern, during the discharge light emission. Thus, it is possible to contemplate the reliability of the discharge light emission.

Figure 31:
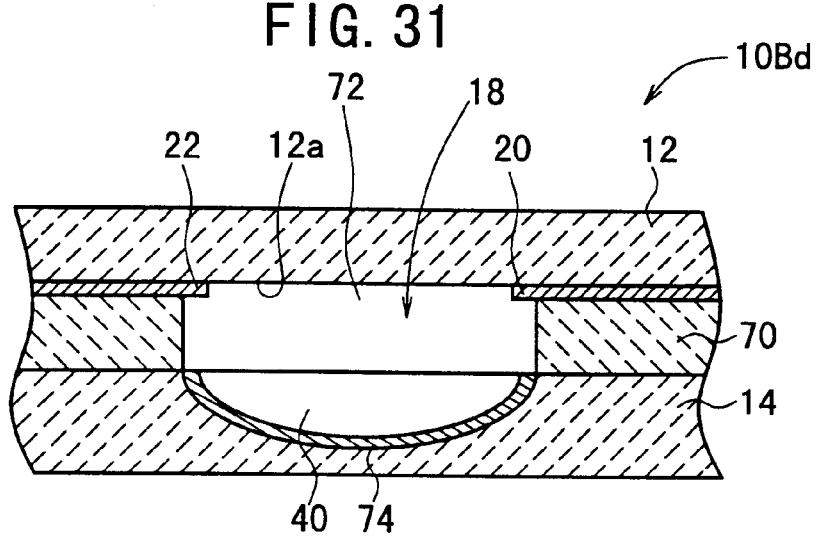
FIG. 31 shows a longitudinal sectional view illustrating, with partial omission, a fourth modified embodiment of the display according to the second embodiment.

Next, as shown in FIG. 31, a display 10Bd according to a fourth modified embodiment comprises three stacked housing members. The upper housing member 12 is formed to have a rectangular plate-shaped configuration. The lower housing member 14 has a rectangular contour, and it includes, for example, a hemispherical or parabola-shaped recess 40 formed at a central portion of its first principal surface 14a. The central housing member 70 has a rectangular contour, and it has a hollow section 72 having approximately the same diameter as the maximum diameter of the recess 40.

In this embodiment, the cavity 18 is formed by the recess 40 of the lower housing member 14, the hollow section 72 of the central housing member 70, and the first principal surface 12a of the upper housing member 12.

Further, in the fourth modified embodiment, a light-reflective film 74, which is made of, for example, aluminum, is formed, for example, by sputtering on the inner wall surface of the recess 40 of the lower housing member 14.

In the display 10Bd according to the fourth modified embodiment, almost all of the light components generated in the cavity 18 are directed to the display surface of the housing 16. Thus, it is possible to achieve a higher brightness. Further, it is possible to effectively avoid the crosstalk of light emission, which would be otherwise caused between the cavities 18. Thus, it is possible to effectively avoid the phenomenon which would otherwise result in the deterioration of image quality such as the image disturbance and the afterimage phenomenon.

Also in this embodiment, it is preferable that the glass material having the light-transmissive property is used for the upper housing member 12, and the glass material having no light-transmissive property is used for the central housing member 70.

Figure 20:
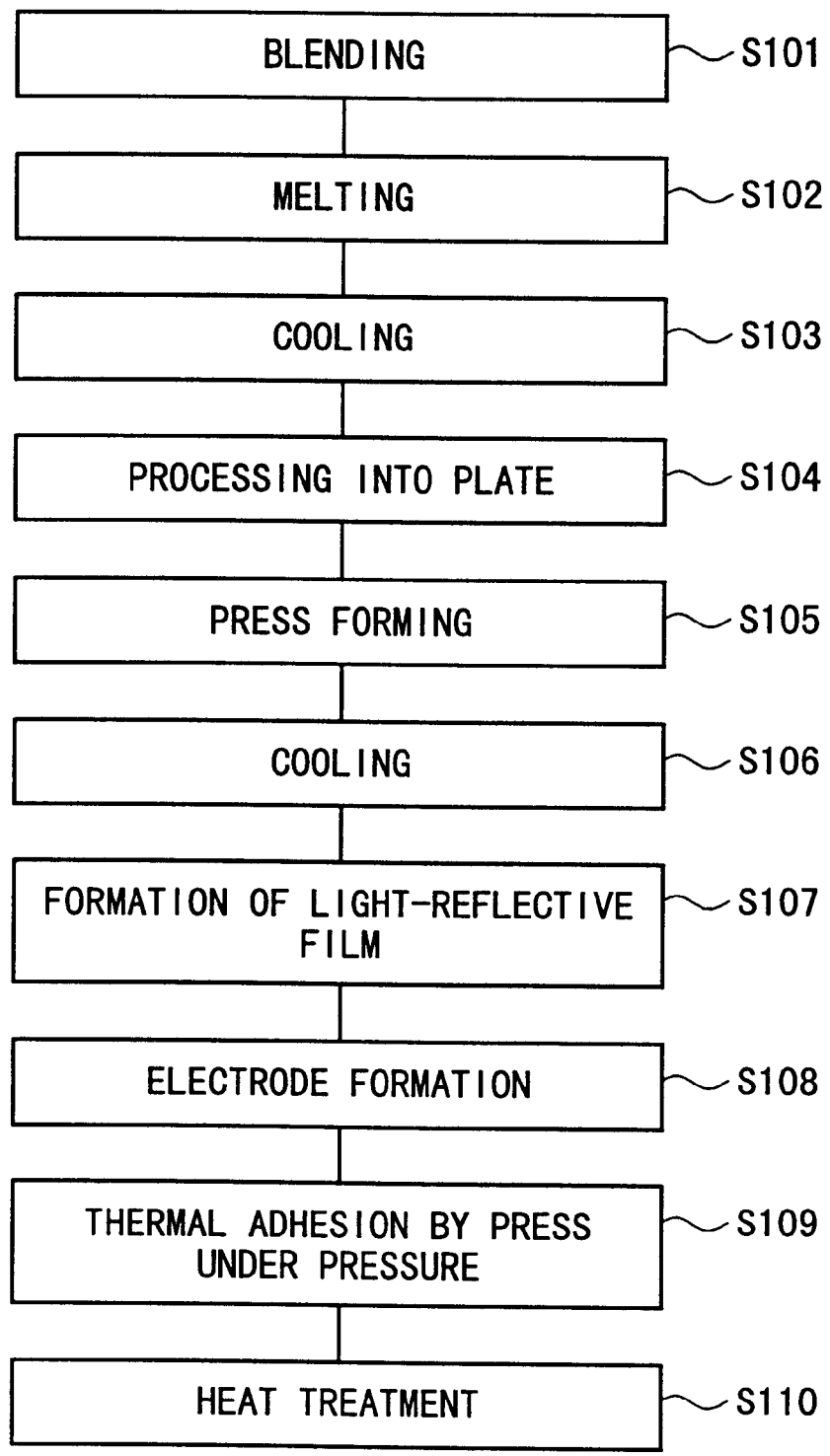
FIG. 20 shows a block diagram depicting steps of a method for producing the display according to the third modified embodiment.

When the display 10Bd according to the fourth modified embodiment is produced, approximately the same steps are executed as those of the production method of the third modified embodiment of the display 10A according to the first embodiment shown in FIG. 20. However, the production method differs in that the wiring arrangement based on the lead wire is not used in the electrode formation in the step S108, but the vertical selection line 24, the signal line 26, and the electrode wires 20, 22 based on the thin film pattern are formed, for example, by the method based on the printing or the method based on the use of the sheet member described above. The common features have been described in detail in the description of the method for producing the display 10B according to the second embodiment, detailed explanation of which will be omitted in this section.

The crosstalk of light emission between the cavities 18 is effectively avoided in the displays 10A, 10B according to the first and second embodiments described above such that the lower housing member 14 of the housing members 12, 14 for constructing the housing 16, which does not contribute to the display expression, is constructed by using the glass material having no light-transmissive property. The crosstalk of light emission between the cavities 18 is effectively avoided in the third modified embodiment (display 10Ac) of the display 10A according to the first embodiment and the fourth modified embodiment (display 10Bd) of the display 10B according to the second embodiment such that the light-reflective film 74 is formed on the inner wall surface of the recess 40 of the lower housing member 14. Besides, the prevention of crosstalk can be also achieved by using arrangements shown in FIGS. 32 to 34.

Figure 32:
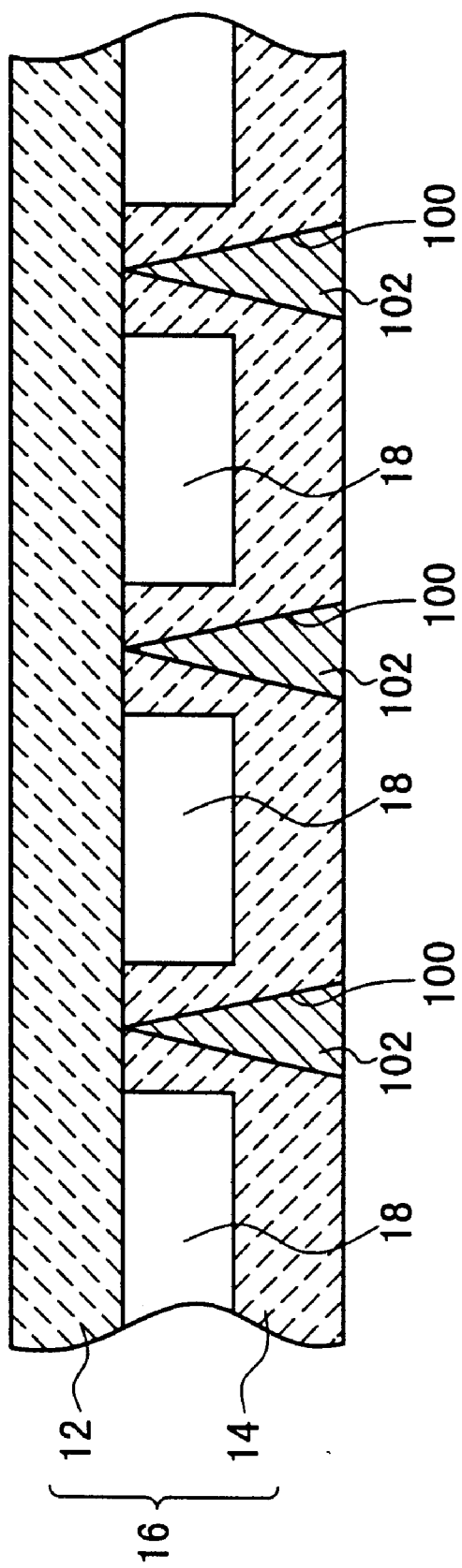
FIG. 32 shows a schematic arrangement illustrating, with partial omission, a display according to a third embodiment.

That is, a display 10C according to the third embodiment shown in FIG. 32 comprises, for example, V-shaped grooves 100 which are formed, for example, by means of press forming so that they extend from the lower surface of the lower housing member 14 between the cavities 18 of the lower housing member 14. A light-shielding substance 102 is charged in the grooves 100.

Figure 33:
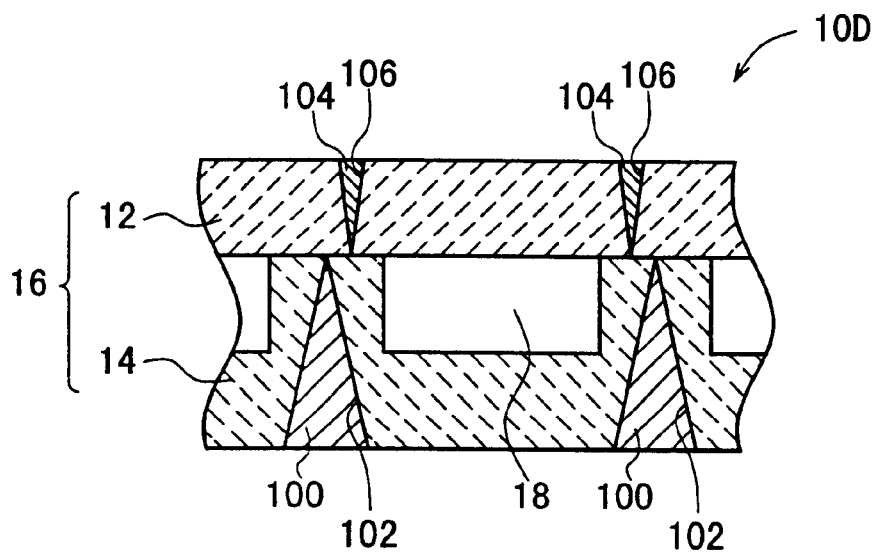
FIG. 33 shows a schematic arrangement illustrating, with partial omission, a display according to a fourth embodiment.

A display 10D according to the fourth embodiment shown in FIG. 33 comprises, in addition to the arrangement shown in FIG. 32, V-shaped grooves 104 which are formed, for example, by means of press forming so that they extend from the upper surface of the upper housing member 12 at positions in the upper housing member 12 corresponding to the intervals between the cavities 18 as well. A light-shielding substance 106 is charged in the grooves 104.

Figure 34:
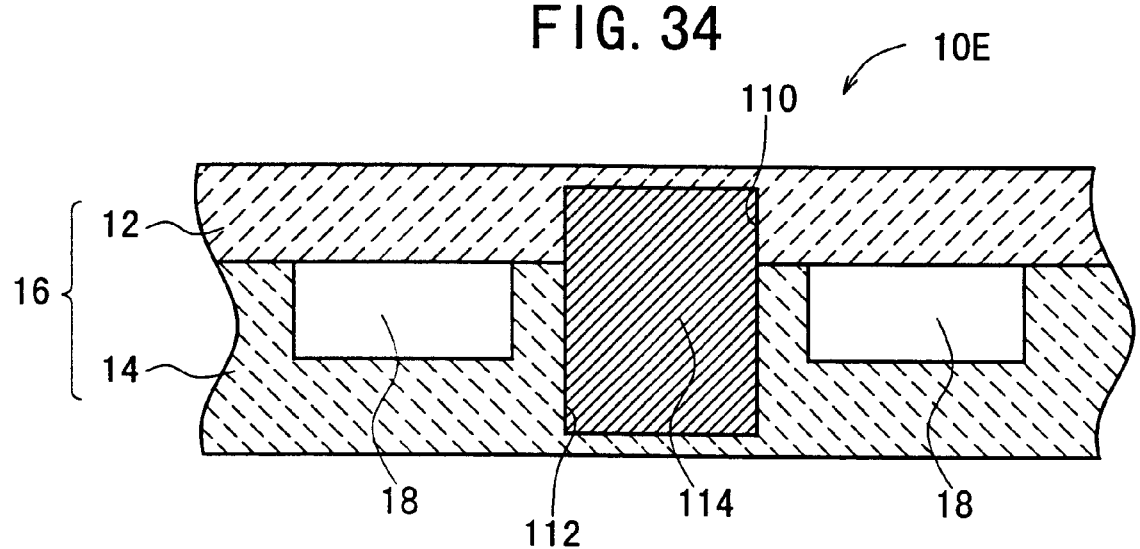
FIG. 34 shows a schematic arrangement illustrating, with partial omission, a display according to a fifth embodiment.

A display 10E according to the fifth embodiment shown in FIG. 34 is arranged as follows. That is, for example, rectangular grooves 110, 112 are previously formed, for example, by press forming at positions between the cavities 18 respectively, of the respective confronting surfaces of the upper housing member 12 and the lower housing member 14. When the upper housing member 12 and the lower housing member 14 are thermally glued under a pressure thereafter, a light-shielding substance 114 is charged in a hollow section which is formed by the grooves 110, 112.

Also in the arrangements shown in FIGS. 32 to 34, it is possible to effectively avoid the crosstalk of light emission, which would be otherwise caused between the cavities 18. Thus, it is possible to effectively avoid the phenomenon which would otherwise result in the deterioration of image quality such as the image disturbance and the afterimage phenomenon.

Next, the color display will be explained concerning the display 10A according to the first embodiment and the display 10B according to the second embodiment. Several representative cases will be explained, in which the color display is applied to the display 10B according to the second embodiment.

Figure 35:
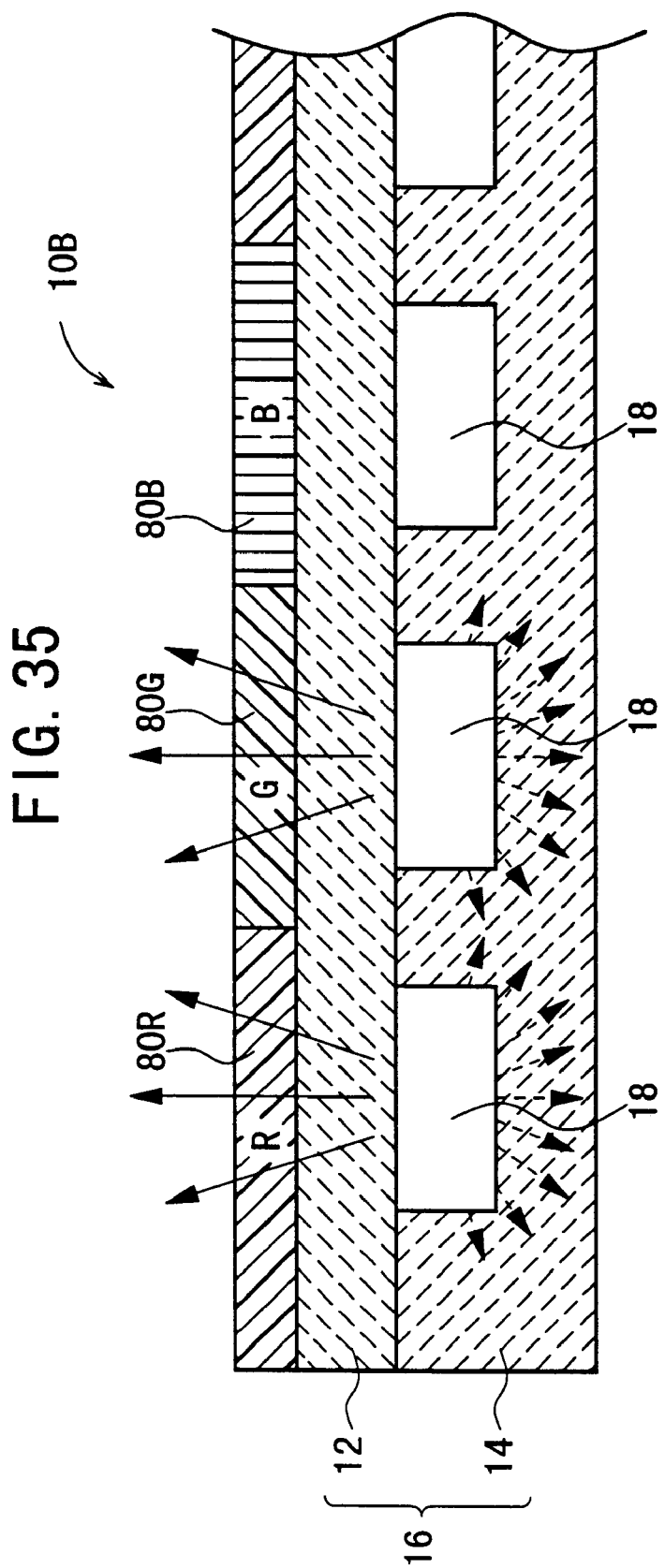
FIG. 35 illustrates a first example arranged for the purpose of color display.

As shown in FIG. 35, a first example for the color display resides in a method in which, for example, color filters 80R, 80G, 80B of R (red), G (green), B (blue) are formed in the unit of three picture elements at positions corresponding to the cavities 18 respectively on the second principal surface (display surface) of the upper housing member 12 which constitutes the housing 16.

Figure 36:
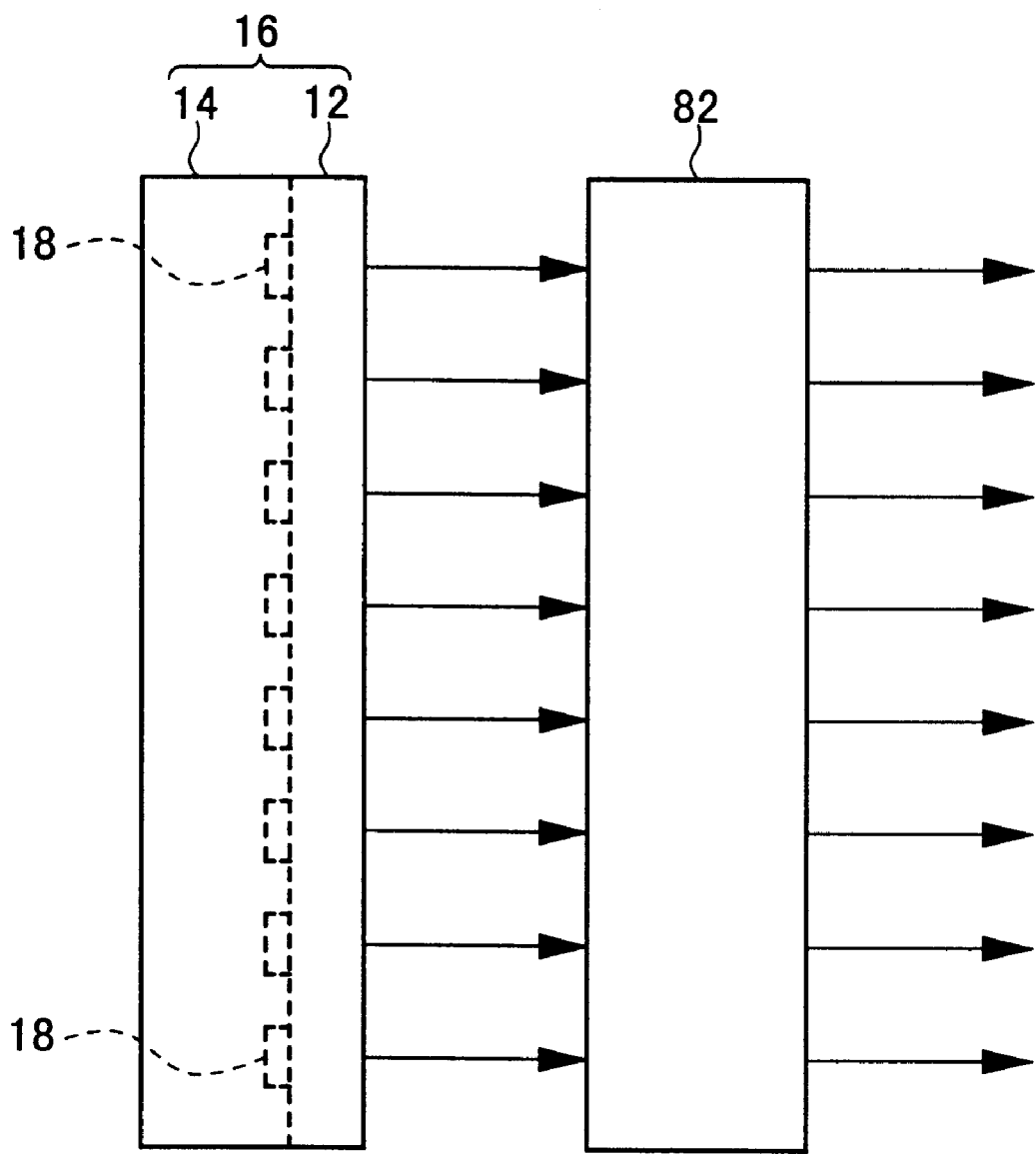
FIG. 36 illustrates a second example arranged for the purpose of color display.

As shown in FIG. 36, a second example for the color display resides in a method in which a means 82 for selecting the light component such as an optical switch and an optical shutter is provided on the side of the second principal surface (display surface) of the upper housing member 12 which constitutes the housing 16.

The xenon gas, which is enclosed in the large number of cavities 18 in the housing 16, has the distinct line spectrum in the infrared region (at a wavelength of about 800 $\mu$). However, the xenon gas exhibits the continuous spectrum in the visible light region, and it has the light components of R, G, B.

Figure 37A:
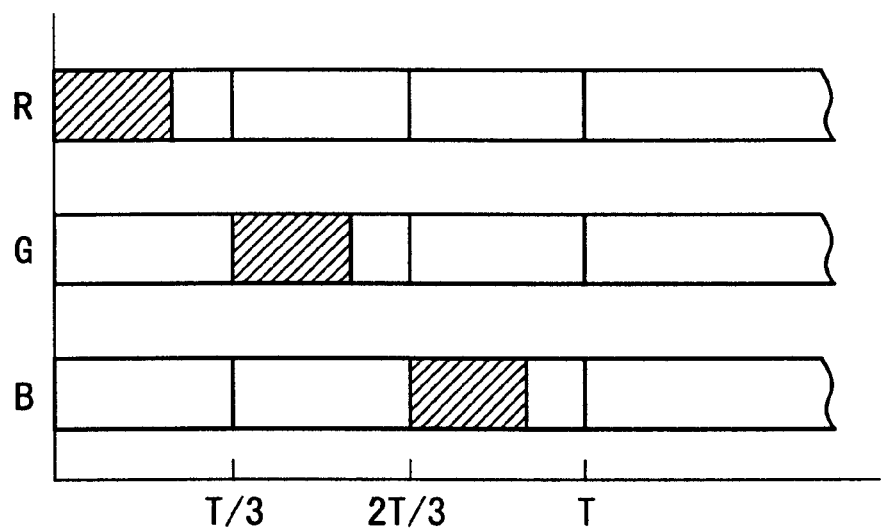
FIG. 37A shows a timing chart illustrating a case in which the ratio of light emission time of RGB is 1:1:1.
Figure 37B:
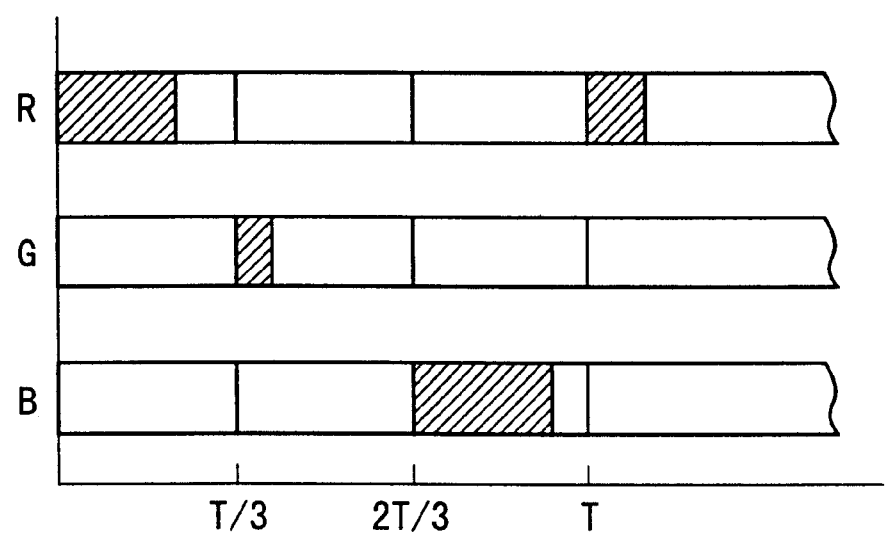
FIG. 37B shows a timing chart illustrating a case in which the ratio of light emission time of RGB is 4:1:5.

It is now assumed that the cycle for emitting light by the aid of the selecting means 82 for the light component is T, and the maximum light emission time for RGB is divided into three. As shown in FIG. 37A, when the ratio of light emission time for RGB is 1:1:1, the white light is obtained. As shown in FIG. 37B, when the ratio of light emission time for RGB is 4:1:5, a neutral color corresponding to the ratio is obtained. Therefore, the time of light emission may be controlled as follows. That is, the light emission time in the cavity 18 is synchronized with the cycle T for light emission so that the light emission time for the three primary colors may be controlled. Alternatively, the light emission time for the three primary colors is synchronized with the cycle T for light emission so that the light emission time in the cavity 18 may be controlled.

The second example is advantageous in that it is unnecessary to increase the number of picture elements as compared with the black-and-white screen even in the case of application to the color display system.

Figure 38:
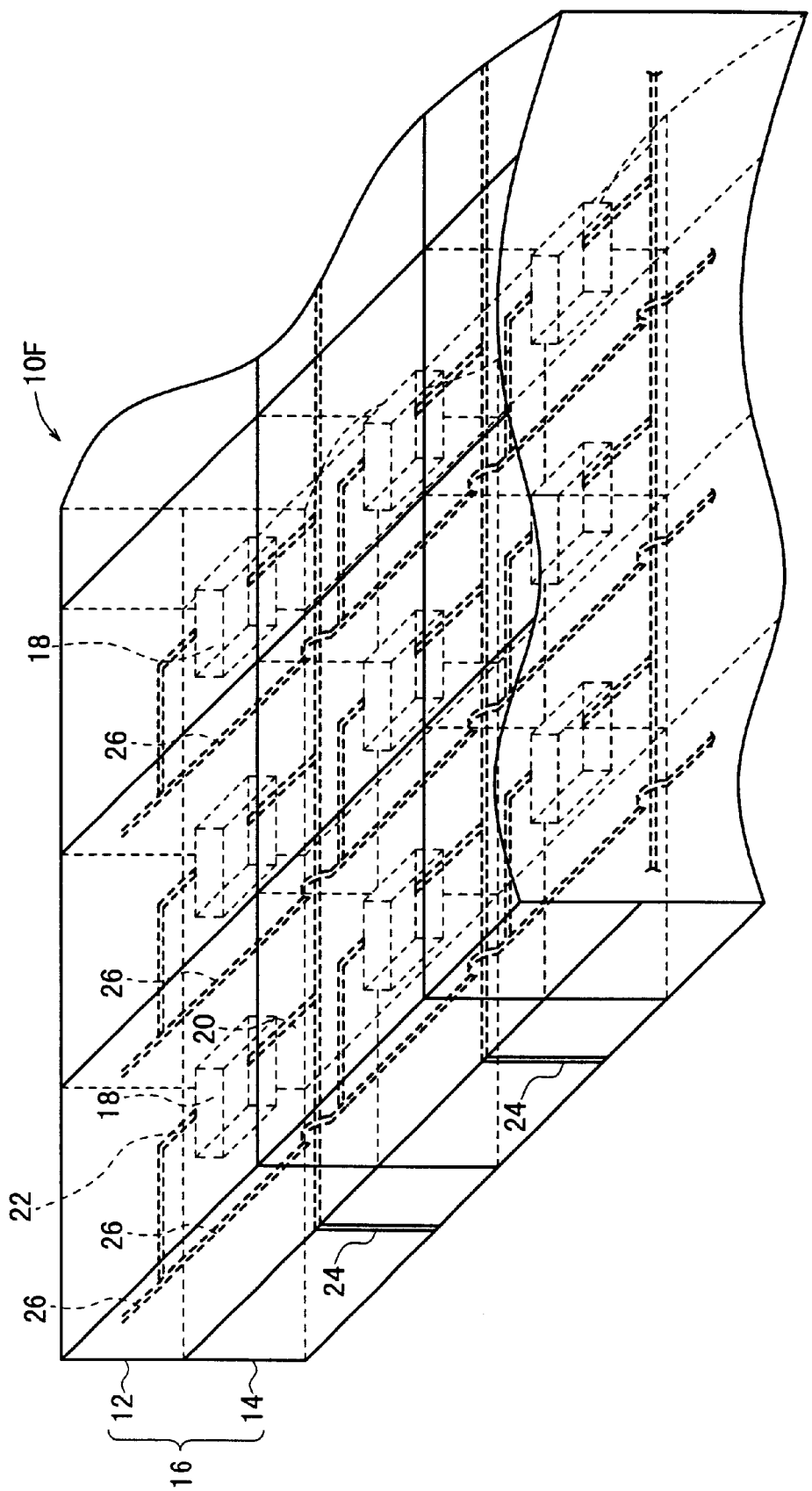
FIG. 38 shows a perspective view illustrating an arrangement of a display according to a sixth embodiment.

In the displays 10A, 10B according to the first and second embodiments described above, the cavities 18 of the number corresponding to the number of picture elements are formed in one housing 16. Alternatively, another arrangement is available as shown in FIG. 38. That is, housings 16 are manufactured, each of which includes only one cavity 18 formed at the inside. The housings 16 are arranged in a number corresponding to the number of picture elements, and they are secured with each other by using, for example, a light-transmissive adhesive to construct one display 10F (conveniently referred to as the "display 10F according to the sixth embodiment"). FIG. 38 is illustrative of a case in which the vertical selection line 24, the signal line 26, and the electrode wires 20, 22 are formed by using the thin film pattern in the same manner as in the display 10B according to the second embodiment.

When the color display is applied to the display 10F according to the sixth embodiment, it is also preferable to adopt the first example (color filter) and the second example (use of the optical switch or the optical shutter) described above.

Alternatively, three types of housings may be prepared, i.e., the housing 16 in which a red coloring agent (for example, Se and sodium gold chloride) is added to the upper housing member 12, the housing 16 in which a green coloring agent (for example, Cr) is added to the upper housing member 12, and the housing 16 in which a blue coloring agent (for example, Co) is added to the upper housing member 12. The three types of housings 16 may be arranged so that they are optimized for the color display. In other words, a method is provided, in which the upper housing members 12 themselves are used as color filters.

In the displays 10A to 10F according to the first to sixth embodiments described above (including the displays concerning the various modified embodiments), the upper housing member 12 and the lower housing member 14, each of which has the plate-shaped configuration, are joined to one another by means of the thermal adhesion by press under the pressure to produce the plate-shaped housing 16. Alternatively, hemispherical housing members may be joined to produce a spherical housing. The shape of the housing 16 is not especially limited. The xenon gas is used as the gas to be enclosed in the cavity 18 of the housing 16. Alternatively, it is possible to use other gases such as mercury and argon.

It is a matter of course that the display and the method for producing the same according to the present invention are not limited to the embodiments described above, which may be embodied in other various forms without deviating from the gist or essential characteristics of the present invention.

As explained above, according to the display concerning the present invention, it is possible to simultaneously realize the integration and the miniaturization of the electronic tube and present the display expression for information transmission at a high brightness.

According to the method for producing the display concerning the present invention, it is possible to easily produce the display which makes it possible to simultaneously realize the integration and the miniaturization of the electronic tube and present the display expression for information transmission at a high brightness.

What is claimed is:

1. A light emission display, comprising:
   a housing including at least two glass members, thermally glued to one another at a predetermined atmospheric pressure to form a plurality of cavities inside said housing;
   at least one of a gas and a light emitting substance contained within said cavities;
   electrodes located between said glass members, wherein said electrodes protrude into each cavity in only a coplanar manner with respect to a main surface of one of said glass members, and wherein when a sufficient voltage is applied to said electrodes, said at least one of a gas and light emitting substance contained within said cavities causes a discharge light emission; and
   wherein an input signal is supplied to said electrodes resulting in selective light emission from said cavities.

2. The display as recited in claim 1, wherein at least one of said members which contributes to display expression is light transmissive.

3. The display as recited in claim 2, wherein the other one of said glass members does not contribute to display expression and is light blocking.

4. The display as recited in claim 1, further comprising a light reflective film formed on a surface portion of an inner wall of each said cavity opposite to a display side of said housing.

5. The display as recited in claim 1, further comprising a light shielding substance interposed between said cavities.

6. The display as recited in claim 1, wherein said electrodes are constructed by lead wires fixed on a main surface of one of said glass members.

7. The display as recited in claim 1, wherein said electrodes are constructed of thin films printed on a main surface of one of said glass members.

8. The display as recited in claim 1, wherein said glass members have a bending strength of not less than 1000 kgf/cm$^2$.

9. The display as recited in claim 8, wherein said glass members have a coefficient of thermal expansion which is substantially zero or which is substantially equal to a coefficient of thermal expansion of said electrodes.

10. A method for producing a display, comprising:
    forming recesses in a first glass member for constructing cavities for enclosing at least one of a gas and a light emitting substance;
    locating electrodes between said first glass member and a second glass member, wherein said electrodes protrude into each cavity in only a coplanar manner with respect to a main surface of one of said glass members, and wherein when a sufficient voltage is applied to said electrodes, said at least one of a gas and a light emitting substance contained within said cavities causes a discharge light emission; and
    thermally gluing the glass members to one another at a predetermined atmospheric pressure.

11. The method as recited in claim 10, wherein said second glass member contributes to display expression and is light transmissive.

12. The display as recited in claim 11, wherein said first glass member does not contribute to display expression and is light blocking.

13. The method as recited in claim 10, further comprising forming a light reflective film on a surface portion on an inner wall of each said cavity opposite to a display side of said display.

14. The method as recited in claim 10, further comprising forming a light shielding substance between said cavities.

15. The method as recited in claim 10, wherein said electrodes are formed by lead wires fixed on a main surface of one of said glass members.

16. The method as recited in claim 10, wherein said electrodes are formed of thin films printed on a main surface of one of said glass members.

17. The method as recited in claim 10, wherein said glass members have a bending strength of not less than 1,000 kgf/cm.

18. The method as recited in claim 17, wherein said glass members have a coefficient of thermal expansion which is substantially zero or substantially equal to a coefficient of thermal expansion of said electrodes.

19. A light emission display, comprising:
    a housing including at least two glass members thermally glued to one another at a predetermined atmospheric pressure to form a plurality of cavities inside said housing;
    at least one of a gas and a light emitting substance contained within said cavities;
    electrodes located between said glass members and protruding into each cavity; and
    a light reflective film formed on a surface portion of an inner wall of each said cavity opposite to a display side of said housing;

wherein an input signal is supplied to said electrodes resulting in selective light emission from said cavities.

20. A light emission display, comprising:

a housing including at least two glass members thermally glued to one another at a predetermined atmospheric pressure to form a plurality of cavities inside said housing;

at least one of a gas and a light emitting substance contained within said cavities;

electrodes located between said glass members and protruding into each cavity; and a light shielding substance interposed between said cavities;

wherein an input signal is supplied to said electrodes resulting in selective light emission from said cavities.

21. A method for producing a display, comprising:

forming recesses in a first glass member for constructing cavities for enclosing at least one of a gas and a light emitting substance;

locating electrodes between said first glass member and a second glass member, said electrodes protruding into each said cavity;

forming a light reflective film on a surface portion of an inner wall of each said cavity opposite to a display side of said display; and thermally gluing the glass members to one another at a predetermined atmospheric pressure.

22. A method for producing a display, comprising:

forming recesses in a first glass member for constructing cavities for enclosing at least one of a gas and a light emitting substance;

locating electrodes between said first glass member and a second glass member, said electrodes protruding into each said cavity;

applying a light shielding substance between said cavities; and thermally gluing the glass members to one another at a predetermined atmospheric pressure.

* * * * *